(12) United States Patent
Thorne

(10) Patent No.: US 7,793,654 B1
(45) Date of Patent: Sep. 14, 2010

(54) SOLAR PANEL POSITIONING APPARATUS AND METHOD

(76) Inventor: Anthony R Thorne, 2978 SW. Ravenwood Dr., Grants Pass, OR (US) 97527

( * ) Notice: Subject to any disclaimer, the term of this patent is extended or adjusted under 35 U.S.C. 154(b) by 157 days.

(21) Appl. No.: 11/464,066

(22) Filed: Aug. 11, 2006

Related U.S. Application Data

(60) Provisional application No. 60/707,578, filed on Aug. 11, 2005.

(51) Int. Cl.
*F16M 11/12* (2006.01)
(52) U.S. Cl. .................. 126/683; 126/438; 126/600; 126/424
(58) Field of Classification Search ............. 126/600, 126/601, 603, 605, 248, 683, 438, 424, 451, 126/425
See application file for complete search history.

(56) References Cited

U.S. PATENT DOCUMENTS

| | | | |
|---|---|---|---|
| 326,711 A | 9/1885 | Braune | |
| 497,079 A | 5/1893 | Severy | |
| 4,172,739 A * | 10/1979 | Tassen | 136/246 |
| 4,249,511 A | 2/1981 | Krisst et al. | |
| 4,295,621 A * | 10/1981 | Siryj | 248/183.2 |
| 4,368,962 A | 1/1983 | Hultberg | |
| 4,585,318 A | 4/1986 | Seifert | |
| 4,930,493 A | 6/1990 | Sallis | |
| 5,275,149 A * | 1/1994 | Ludlow | 126/686 |
| 5,758,938 A | 6/1998 | Osterwisch | |
| 6,899,097 B1 * | 5/2005 | Mecham | 126/591 |

* cited by examiner

*Primary Examiner*—Steven B McAllister
*Assistant Examiner*—Nikhil Mashruwala
(74) *Attorney, Agent, or Firm*—Dwayne E. Rogge; Hughes Law Firm, PLLC

(57) ABSTRACT

A solar tracking system comprising a solar panel, a support base, and a panel mounting section mounted to the support base for rotation about a generally vertical axis of rotation. The panel is mounted to the mounting section to be able to rotate about a generally horizontal secondary panel axis of rotation. There is a panel positioning section comprising a base positioning section and an intermediate positioning section having a rear connecting portion to contact the base connecting region and a forward connecting positioning location to connect to the panel at a forward panel connecting positioning location. The intermediate positioning section has a linking axis extending between the rear connecting positioning location and the panel connecting location. The panel is rotated about the main axis of rotation and the intermediate positioning section changes its angular position relative to the base positioning section to cause the tilt angle of the panel to change to track the sun. The positioning section can have its connecting location(s) adjusted to be adapted to both summer and winter conditions so that it is possible to maintain the panel in the proper orientation.

17 Claims, 17 Drawing Sheets

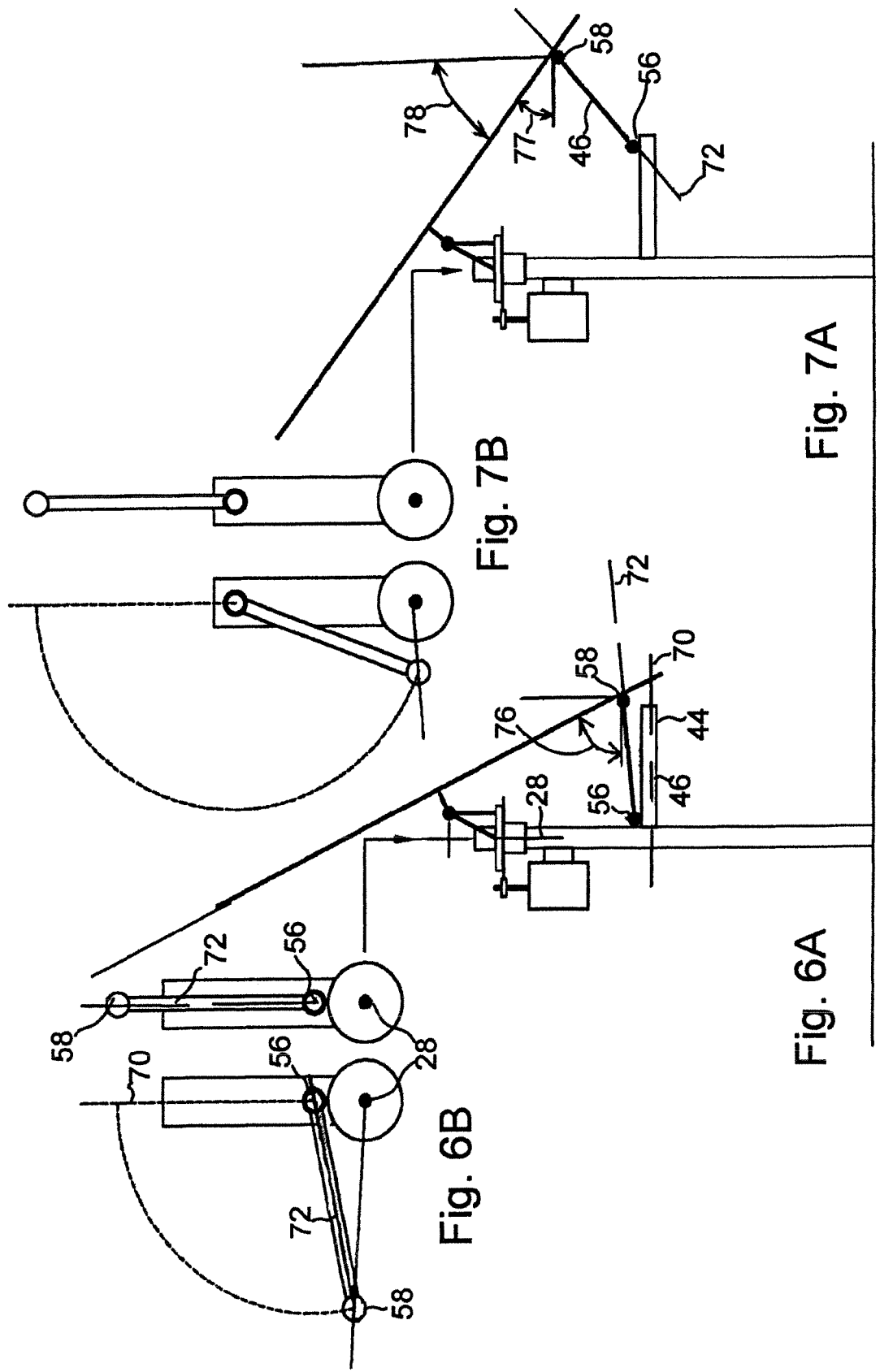

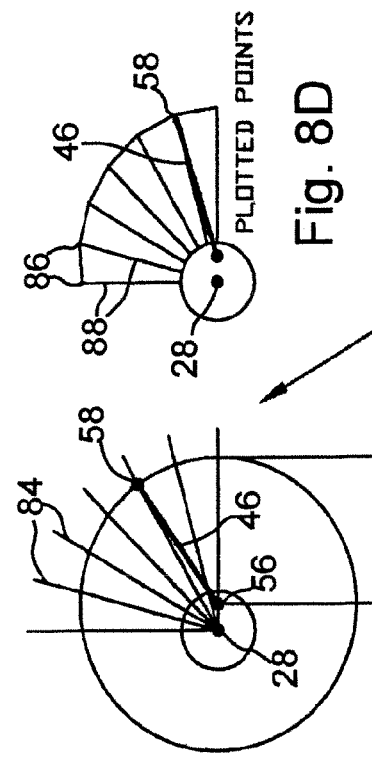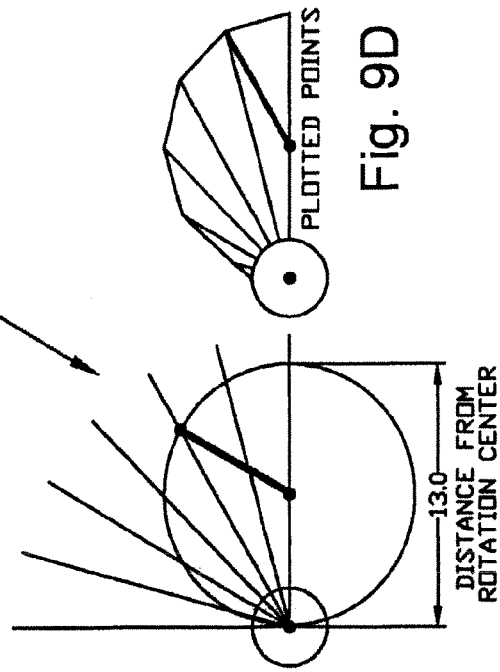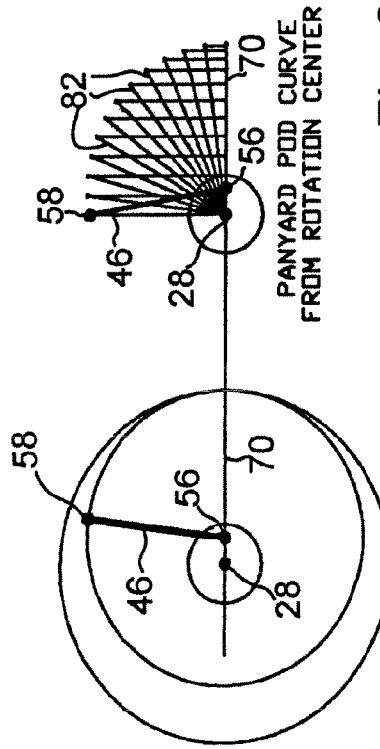

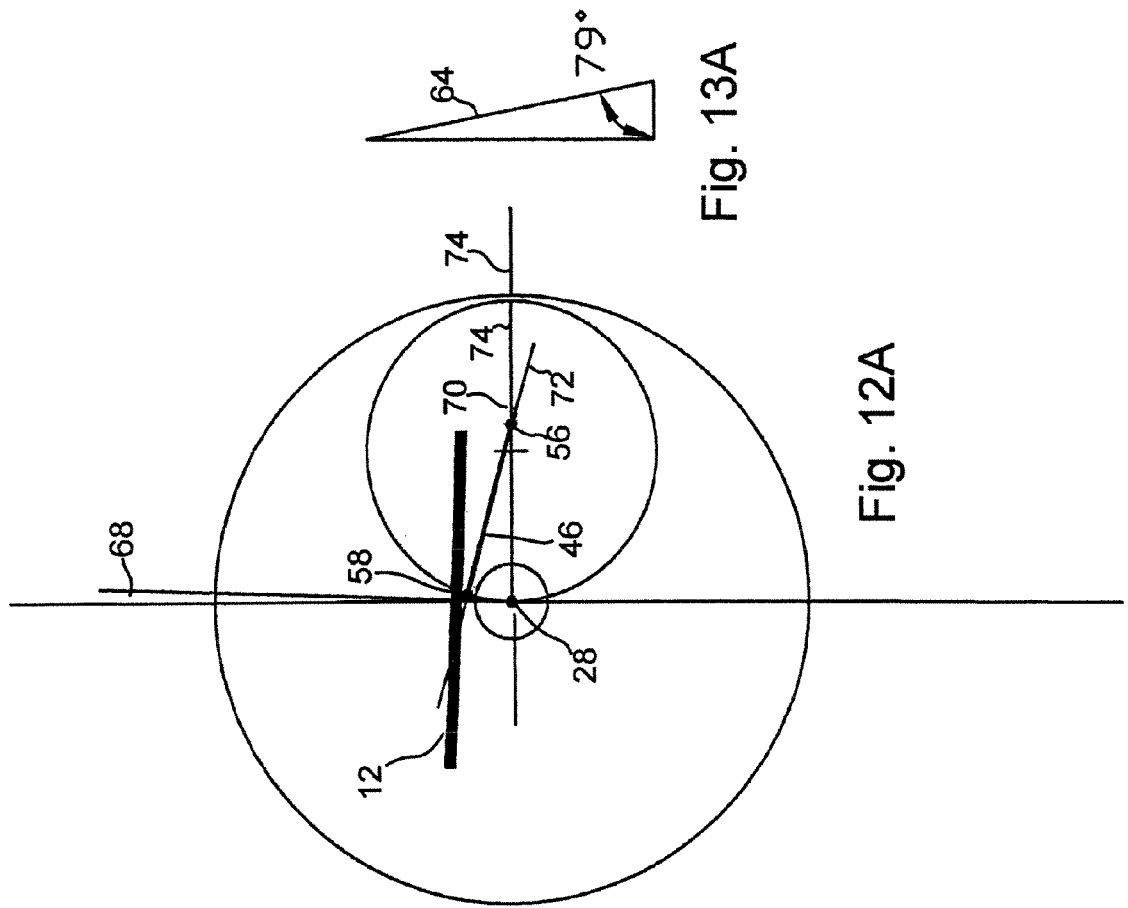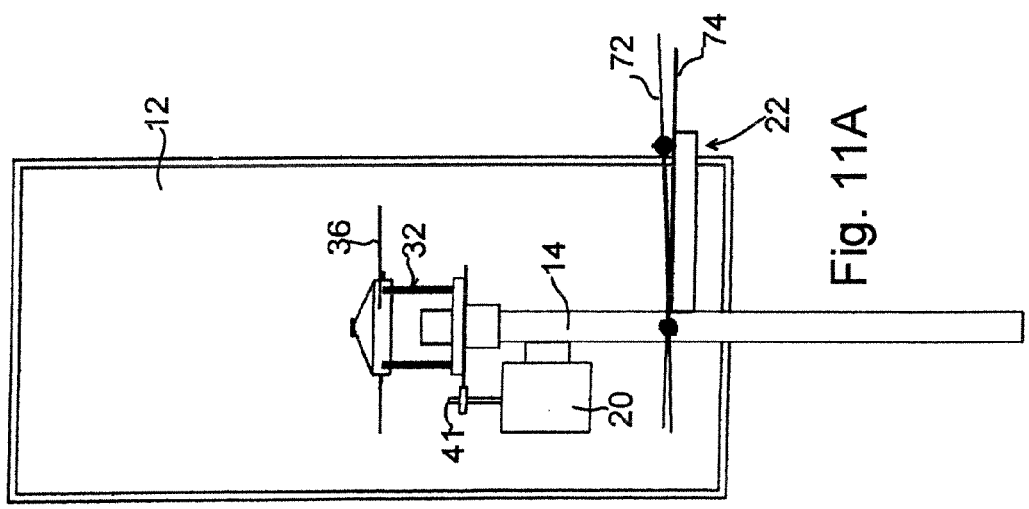

EFFECTIVE ANGLE OVER THE DAY BASED ON DISTANCE TO ANGLE

SOLAR PANEL POSITIONING APPARATUS AND METHOD

RELATED APPLICATIONS

This application claims priority benefit of U.S. Ser. No. 60/707,578, filed Aug. 11, 2005.

BACKGROUND OF THE INVENTION a) Field of the Invention

The present invention relates to tracking devices and methods, more particularly to a solar tracking device and method.

b) Background Art

For a number of years photovoltaic solar panels have been used to cause solar energy to be converted to electric power. One practice is to face the solar panels in a stationary alignment position with the panels being placed in what might be called a "compromise position to optimize its effectiveness in developing electrical energy. Another practice is to mount the solar panels to active solar trackers (motorized or other mechanized methods for following the sun's path) so that the front surface of the panel is closer to a more optimized position perpendicular to the sun's rays through the course of the day.

The solar panels that are utilized in connection with trackers are able to produce twenty to twenty-five percent or more power annually than fixed solar panels. However, the cost associated with the hardware, sensors and firmware for solar trackers can be an expensive for small solar array system owners. Accordingly, cost effective tracking systems which also are safe and reliable are highly desired.

Another complicating factor is that as the seasons change, the maximum height of the sun at noon as well as the sunrise and sunset locations of the sun vary so that a tracking system that is set for optimized operation in the summer time may need adjustments when operating in the winter, fall and spring seasons.

BRIEF DESCRIPTION OF THE DRAWINGS

FIGS. 6A and 7A are simplified drawings of the side elevational view of the first embodiment with the linking member being positioned in two different positions, with FIG. 6A being a winter setting and FIG. 7A being a summer setting;

FIGS. 6B and 7B correspond to FIGS. 6A and 7A, which each showing the linking member in a top plan view in two different positions at a morning position and a mid-day position;

FIGS. 8A and 9A show two schematic top views of the system showing the linking member in winter and summer positions respectively;

FIGS. 8B and 9B relate to FIGS. 8A and 9A and are somewhat schematic views showing the panel connecting location of the linking members in different locations, and also showing the distance to a positioning base connecting location;

FIGS. 8C and 9C, relating to FIGS. 8A and 9A, are schematic views illustrating radial lines from the vertical main axis of rotation that would be perpendicular to the lateral alignment axis of the panel of the system when it is at that location;

FIGS. 8D and 9D, relating to FIGS. 8A and 9A, are schematic views illustrating the distance of the panel connecting location to the main axis of rotation at different locations of the panel;

FIGS. 11A-11F are simplified side elevational views of the system with FIG. 11A showing the sequence of the panel initially in its beginning morning location, moving through transition positions to the position in FIG. 11F showing the system with the panel in its mid-afternoon condition.

FIGS. 12A-12F correspond to FIGS. 11A-11F, respectively, and are top plan views viewed looking downwardly in a direction parallel to the main center axis of rotation, showing the location of the lower edge portion of the panel and the linking member in their various positions in movement through the positions of FIGS. 11A-F;

FIGS. 13A-13F correspond to FIGS. 11A-11F and 12A-12F showing the tilt angle of the alignment plane of the panel with tilt angle at the morning position being at seventy-nine degrees, and at the mid-day position having an angle of forty-five degrees;

EMBODIMENTS OF THE PRESENT INVENTION

Figure 1:
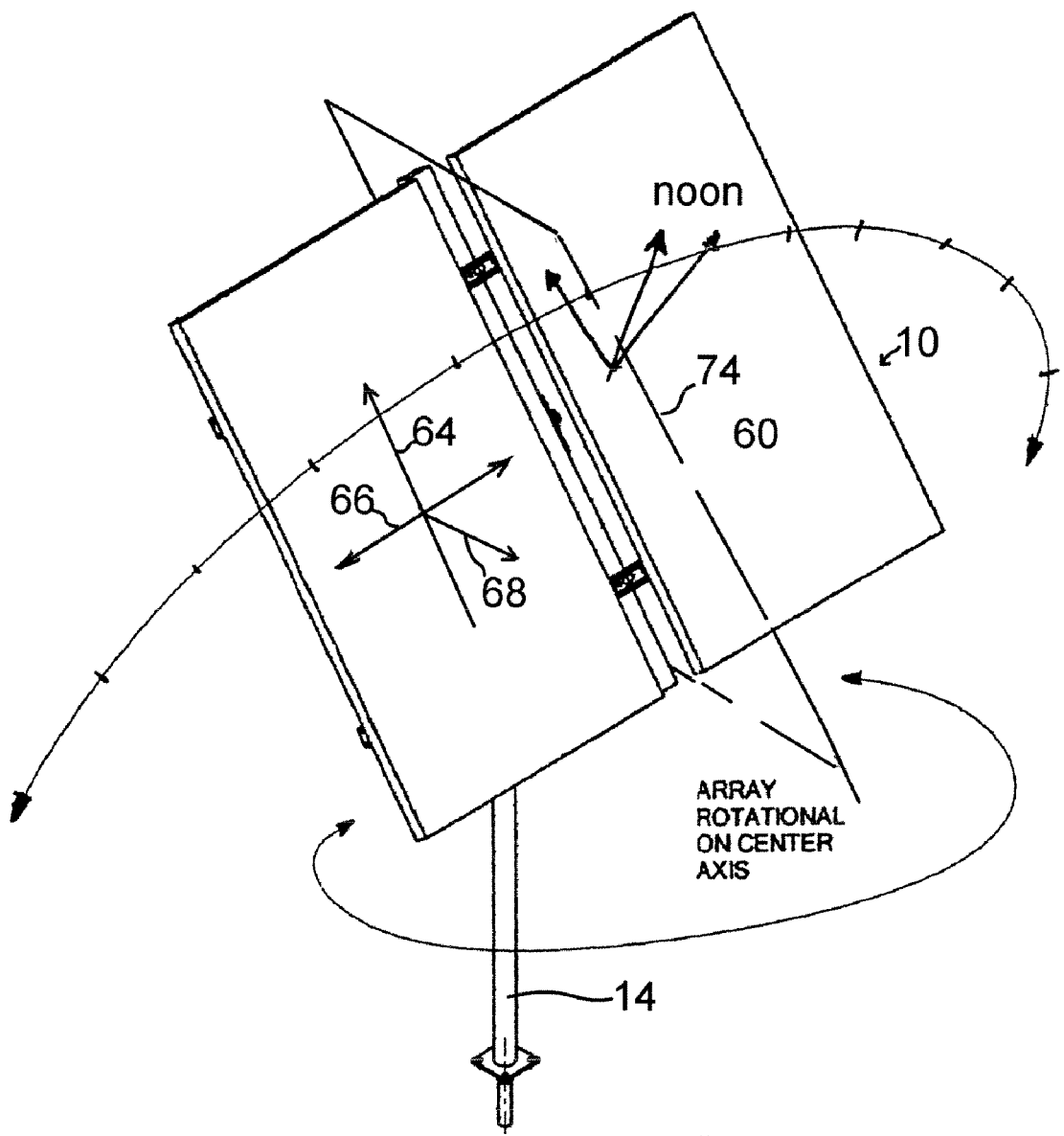
FIG. 1 is a isometric view of the system of a first embodiment.

In describing the system of these embodiments of the present invention, there will first be a relatively brief discussion of the main components of this first embodiment of the system, followed by a more detailed description of the structure and functions of the various components. Then there will be a more detailed description of the functional relationships and the method employed. This will be followed by a description of a second embodiment.

Reference will first be made to FIGS. 1-4. The solar tracking system 10 of this first embodiment comprises a solar panel 12 which has a forward facing surface region and which is supported by a support base which in this embodiment is provided as a generally vertically aligned pole 14. At the top of the pole 10 there is a panel mounting section 16 which (as its name suggests) mounts the solar panel 12 to the support base (i.e. the upper end of the pole 14). There is a drive section 18 at the upper end of the pole 14, and this drive section 18 comprises an electric motor 20 mounted to the pole 14 to rotate the panel 12. There is a panel positioning section 22 which positions the panel 12 on its path of travel.

In this particular embodiment, the solar panel 12 is shown as an array of photo-voltaic cells which convert the energy from the sun to an electric current. However, within the broader sense, the solar panel could incorporate other energy transforming devices at its forward facing surface region, such as a solar concentrating device to reflect the rays from the sun toward a smaller location where the heat is concentrated for some purpose, such as cooking, or possibly a panel which is used simply to absorb the heat from the sun for some other purpose (for example to heat a fluid medium such as water).

The pole 14 has a lower end 24 which is anchored at a ground location and an upper mounting end 26 to which the mounting section 16 is mounted for rotational movement about a generally vertical main axis of rotation 28. The mounting section 16 comprises a mounting member 30 which is mounted to the upper end of the pole 14 for rotation about the main axis of rotation 28 which in this embodiment is conveniently made to coincide with vertical center axis of the pole 14.

The rotatable mounting member 30 comprises a support bracket 32 which has a pair of mounting ears 34 spaced a short distance apart from each other. There is a horizontal transversely aligned pivot pin 35 extending between the two ears 34. At a mid location of the back side of the panel 12, there is a matching support bracket 38 which engages the pivot pin 35 which permits rotational movement of the panel about a generally horizontal secondary axis of rotation (which will also be designated 35) which is coincident with the pivot pin 36. This secondary axis of rotation 36 is spaced a short distance away from the main axis of rotation 28; and is perpendicular to a radius line drawn from the main axis of rotation 28 to a center point on the pivot pin 36.

The aforementioned motor 20 of the drive section 18 has a drive output 40 which acts through a transmission indicated schematically at 42 to rotate the mounting member 30 and thus rotate the panel 12 about the main axis of rotation 28. The drive section 18 is computer controlled and is programmed so that the motor 20 will move the panel in a rotational path from a morning location where the panel 12 is facing east, as the sun is rising, through morning transition locations (region) to a mid-day location, in which the panel 12 is facing the mid-day sun, and then through afternoon transition locations (region) to an end location where the panel 12 is facing the setting sun. When the panel 12 is traveling in its rotational from dawn to sunset, the panel positioning section 22 is changing the tilt angle of the panel 12 so that the panel 12 is at an optimized position relative to the direction of the sunlight. Then during the idle night period, the motor rotates the panel 12 back to its original position where it is facing substantially in an east direction.

The aforementioned panel positioning section 22 comprises two main components, namely a positioning base section 44 which in this embodiment is provided as a single base member 44, and an intermediate positioning section 46 which in this particular embodiment is provided as a linking member 46. The positioning base member 44 has in this embodiment a rear end mounting location 48 by which a rear end portion 50 of the member 44 is fixedly mounted at 48 to the pole 14, and extends from the mounting location 48 in a horizontal forward direction. The positioning base member has a connecting region 52 extending horizontally along the positioning base member 46. Further, it has a moveable connecting location 54 located in the connecting region 52.

The linking member 46 has a first pivot connection 56 to connect at a selected connecting location 54 to the positioning base member 44. The linking member 46 has a second pivot connection location 58 that is a pivot connection to the panel 12 at, or proximate to, a lower central location of the panel 12. As will be described in more detail later herein, the positioning section 22 causes the tilt angle of the panel 12 to change during the path of travel of the panel 12 from its morning location to its end location in the late afternoon or early evening.

To turn our attention now to the panel 12, in this embodiment, the panel 12 comprises, as indicated previously herein, an array of photo-voltaic cells which lie in a single plane. The panel 12 is shown as two panel sections 59 spaced laterally from one another and are joined together by a suitable support frame, or there could be three, four or more panels. These two panel sections 59 are positioned in the same plane, and functionally these sections 59 are to be considered as a single panel 12.

The panel 12 has a front surface 60, and a panel alignment plane 62 which in this instance coincides with the planar front surface 60 of the panel 12. In terms of function, the alignment plane 62 is to be interpreted to mean a positioning reference plane which is perpendicular to the direction of the rays from the sun in its optimized operating position.

Thus, with the panel 12 comprising an array of photovoltaic cells, the alignment plane would coincide with the plane that is occupied by the solar cells. In the case of a solar energy concentrating device which redirects the rays from the sun to a smaller location, the panel alignment plane would normally be the plane that is perpendicular to the longitudinal center axis of the elliptical reflecting curved surface for the solar rays that would optimize the concentration of the solar energy. With the panel 12 comprising an array of photovoltaic cells, the alignment plane should be within fifteen degrees of perpendicular alignment with the incoming solar rays.

For purposes of describing the functioning of the system 10 of this embodiment, the panel 12 shall be considered as having a central reference location 63 (see FIG. 2) which is positioned adjacent to the panel alignment plane 62. On the assumption that the solar panel is close to being symmetrical about vertical and longitudinal axis of the panel 12, this central reference location 63 would be (or may be) at (or very close to) the geometrical center of location of the panel 12 since the center of gravity will likely be very close to the geometric center location. For various reasons, the center reference location 63 would not be positioned too far from the main center axis of rotation 28.

The alignment plane 62 coincides with (and thus is defined by) two axes, namely a tilt angle alignment axis 64, and a lateral alignment axis 66 (see FIG. 1). Then there is a solar alignment axis 68 which is perpendicular to the panel alignment plane and also perpendicular to the tilt angle axis 64. For ease of illustration the axes 64, 66 and 68 are shown shifted to the left. It is to be understood that these are actually centered on the panel 12. All three of these axis 64, 66 and 68 meet at the central reference location 63. With the panel 12 in its optimized position, the solar alignment axis 68 would be parallel with the direction of the rays of the sun. The alignment of the tilt angle alignment axis 64, being coincident the alignment plane 62, defines the tilt of the panel 12 relative to a horizontal axis, and the lateral angle alignment axis 66, also being coincident with the alignment plane 62, remains perpendicular to the solar alignment axis 68.

To facilitate the task of describing the operation of this first embodiment of the present invention, there will now be presented some additional terminology relating to various functional features and aspects. There is a positioning base axis 70 (see FIG. 2) and this is defined as an axis perpendicular to the main vertical axis of rotation 28 and extending through the connecting location 56 where the linking member 46 connects to the positioning base member 44. Then there is a linking axis 72 which is an axis which extends from the base connecting location 56 to the panel connecting location 58 where the linking member 46 connects to the panel 12.

There is yet another reference component which should be defined, and this is the "mid-day vertical alignment reference plane 74" (see FIG. 1). This is defined as a plane which, with the panel 12 in the mid-day location is coincident with both the main axis of rotation 28, the solar alignment axis 68, the central reference location 63, and the positioning base axis 70. The term "mid-day" means the time of day when the sun is at its maximum elevation and mid-way between sunrise and sunset.

Figure 2:
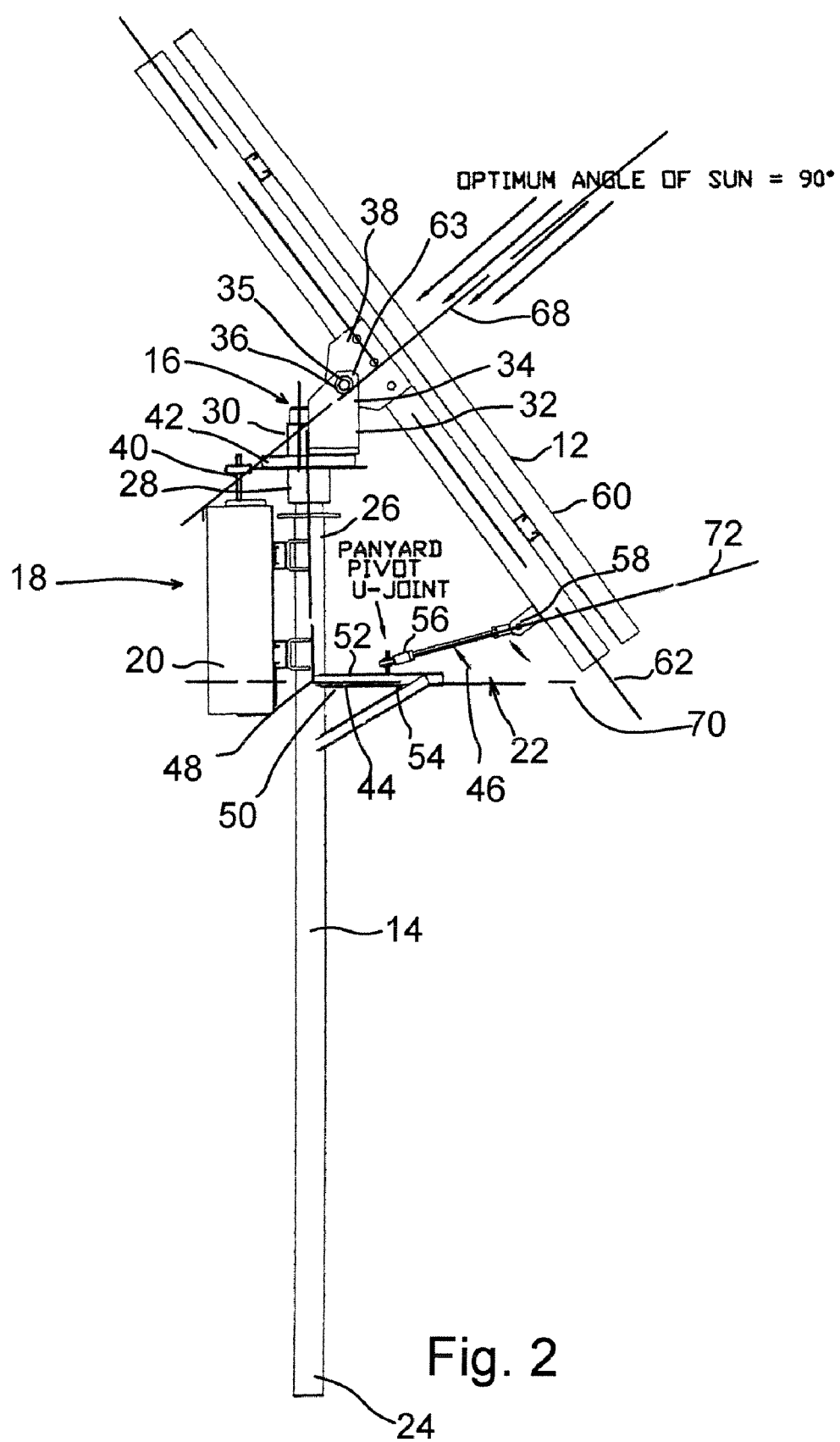
FIG. 2 is a side elevational view of said system.
Figure 3:
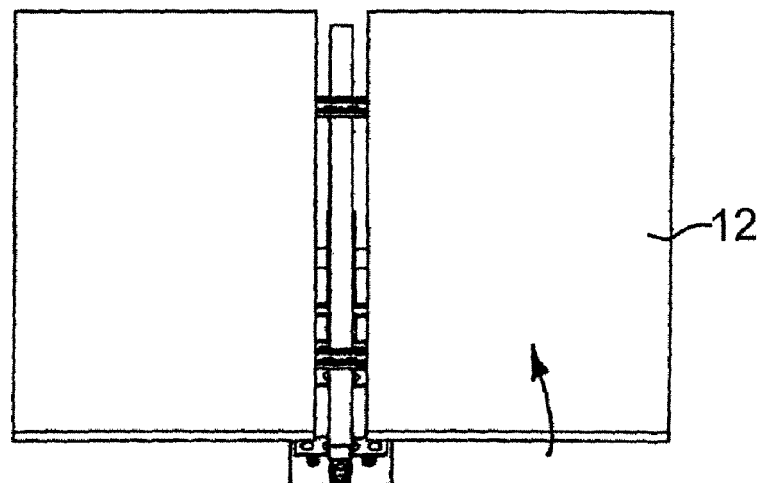
FIG. 3 is a front view of the system.
Figure 4:
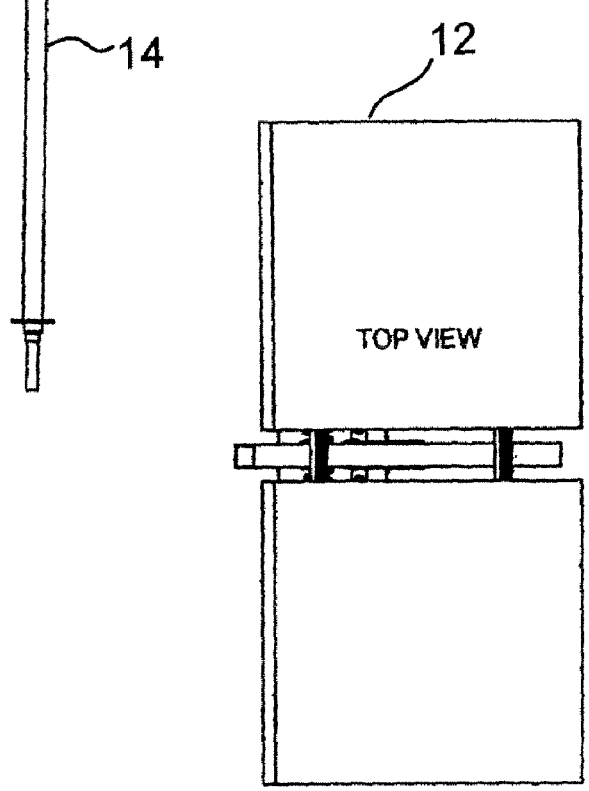
FIG. 4 is a top plan view of the system.

To describe now the operation of this system, let us begin by examining the manner in which the panel 12 is mounted and how its tilt angle changes relative to rotational movement of the panel 12. With the panel 12 being mounted to the support bracket 32 at the pivot pin 35, the movement of the panel 12 is constrained to movement about the secondary axis of rotation 36 of the pin 35. As indicated previously the operation of the system is powered entirely by the motor 20 acting through the transmission 42 to cause the rotation of the support bracket 32 of the panel mounting section 16 to in turn cause rotation of the panel 12 about the main vertical axis of rotation 28, and also to cause the linking member 46 to control the position of the tilt angle alignment axis 64. The term "upper" or "upward", as applied to the solar panel 12 shall mean a location at, or a direction toward, that portion of the panel 12 at an upper panel location as seen in FIG. 2, and the term "lower" or "downward", shall mean the opposite.

Let us assume for the moment that the panel 12 is at its mid-day location and that it is at a tilt angle such that its alignment plane 62 is substantially perpendicular to the rays of the sun. As the panel 12 continues its rotational movement about the main vertical axis of rotation 28, with the base connecting location 56 of the linking member 46 remaining at a stationary location since it is connected to the stationary positioning member 44, and with the outer panel connecting location 58 being connected to the bottom central portion of the panel 12, the linking member 46 will be caused to move on a rotational path about the location of the base connecting location 56. This in turn causes the lower portion of the panel 12 to be moved closer to the main vertical axis of rotation 28.

Figure 5:
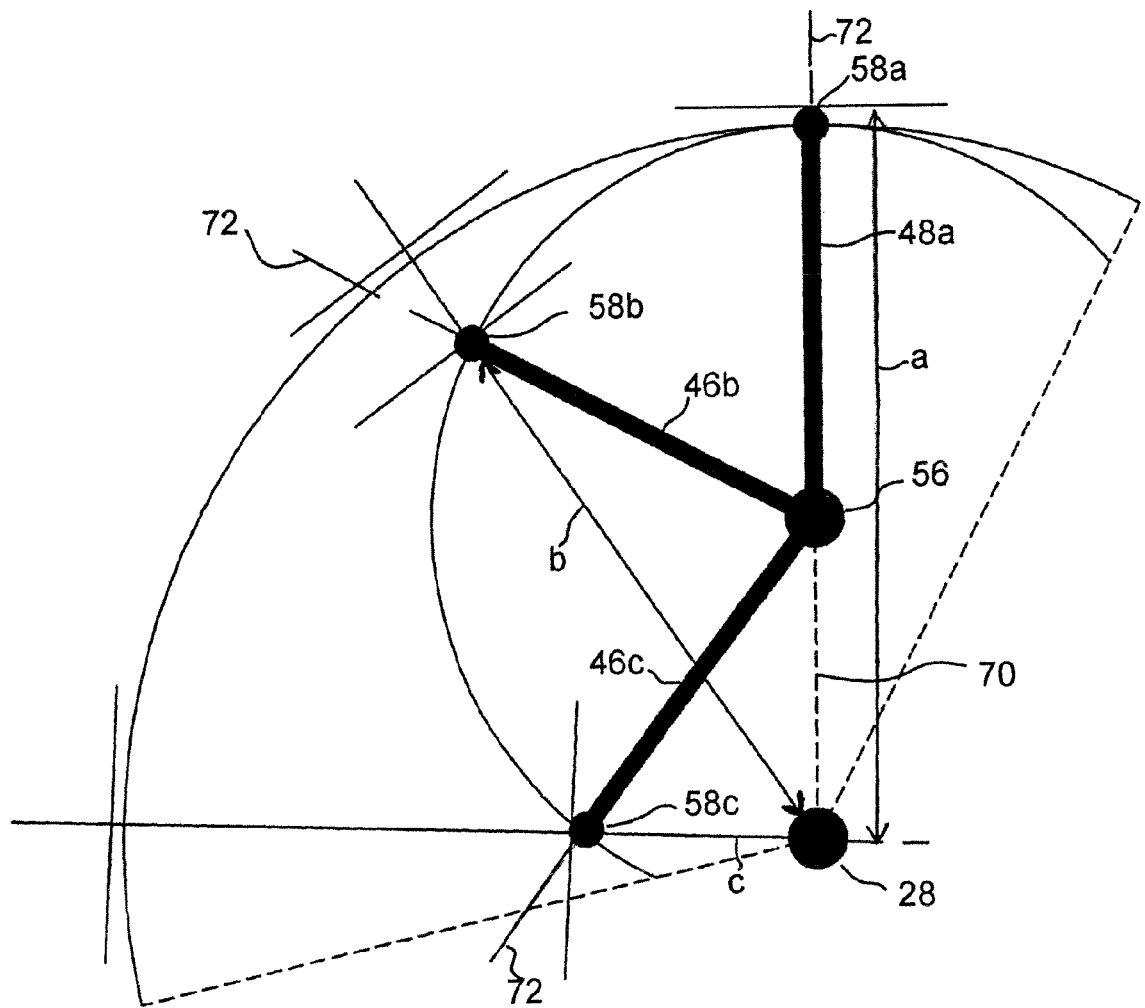
FIG. 5 is a semi-schematic drawing looking down on the movement of a linking arm of the positioning section of a first embodiment in three different positions.

To illustrate this, reference is made to FIG. 5. When the panel 12 is at its mid-day location the linking axis 72 of the linking member 46 is aligned with the main vertical axis of rotation 28 so that the distance from the panel connecting location 58a to the main center of rotation 28 is at a maximum. That distance is indicated at "a", and the linking member 14 in that position is designated 46a. As the support bracket 32 continues to rotate from the position at 46a by about another thirty-five degrees to cause the corresponding thirty five degree rotation of the panel 12, the linking member 46 moves to the position indicated at 46b, so that the end connecting location 58b has moved closer to the main axis of rotation 28. The lines in FIG. 5 indicated at 73 are parallel to the longitudinal alignment axis 66 of the panel 12.

This distance at "b" is about 92% of distance "a". Then with the continued rotation of the panel 12 to a ninety degrees position at 46, the outer connecting location 58 has moved to the location of 58c, and its distance from the main axis of rotation has been made smaller yet, as indicated by the distance location indicated at "c" of FIG. 5, which is about 35% of distance "a".

However, during this entire ninety degrees of rotation about the main axis of rotation 28, the secondary axis of rotation 36 at the pivot pin 36 remains at the same distance from the main center of rotation 14. Accordingly, at the mid-day position the slope of the panel 12 is less steep so that the panel 12 is properly aligned with the rays from the sun which is at its highest position in the sky, and at the sunset position, the panel is moved to a steeper tilt angle so that it is closer to being perpendicular to the sun rays coming from the setting sun.

It becomes obvious that this same manner of movement for the panel 12 takes place from the sunrise hour of to the mid-day location, but in reverse, with the panel 12 being initially at a steeper tilt angle, and with the angle being less steep as it moves to the mid-day location.

As a note of explanation (and clarification) regarding FIG. 5, the dimensions of "a", "b", and "c" are an approximation, the reason being that in FIG. 5 the drawing illustrates the linking member 46 moving in a manner that it would lie totally in a horizontal plane where it would in top plan be viewed as having a constant length. However, as can be seen in FIG. 2, in the mid-day location of FIG. 2, the linking member has a moderate upward slant. However, as the panel 12 rotates from the mid-day position, the tilt angle of the linking member 54 will change, the reason being that the location of the panel connecting location 58 will change in elevation as the panel 12 moves toward a greater tilt angle. However, FIG. 5 does illustrate the basic pattern of movement relative to proximity to the main axis of rotation 28 during ninety degrees of rotational movement about the main axis of rotation 28.

The system 10 of this embodiment is designed so that the tracking movement of the panel 12 can easily be adjusted so as to optimize its performance during different times of the year when the sun travels different paths along the sky. For example, for a person located in the north to south middle location of the United States, in the summer season, the sun will rise in the east at an earlier time of morning and the location where it rises above the eastern horizon would be further north. At the mid-day location the sun would be at its maximum height in the sky, and it would set in the west at a location which would also be further north then the position of the person who is located in the center of the United States.

The angular movement of the sun moving from east to west is at a constant angular rate. Thus, in the operation of this embodiment, the motor 20 will be operated so that the net rate of rotational speed of the rotatable mounting member 30 is at a constant rate matching the angular movement of the sun, regardless of time of day and regardless of what is the season. For convenience of description, it will be assumed that the motor 20 will be turned at a constant rotational speed so that the rotational speed of the mounting member 30 would be at a constant rate, matching the movement of the sun. However, in actual practice, the motor could be activated at periodic intervals, such as every one-half hour or every hour, to move the mounting member 30 through an angular increment of travel so that the overall net rate of rotational speed matches the movement of the sun.

However, even though the panel 12 will not be at the fully optimized alignment location all of the time, the relatively small shift of alignment from one location to another is sufficiently small so that the energy conversion accomplished by the panel 12 is actually only slightly less than the optimum, and this would be offset by the savings in the operation of the electric motor 20. Then at the end of the day, the motor would be operated in the opposite direction to move the panel back to its' morning position.

However, the vertical movement of the sun in the sky would be at a greater angular velocity in the earlier part of the day when the sun is first moving upwardly from a direction that is straight east, and as the sun moves closer to the mid-day location, the rate at which the sun "elevates" relative to the horizon flattens out in a gentler curve. Then after passing through the mid-day location the sun follows a path which is a mirror image of the path from the morning position to the mid-day position.

During the wintertime, the sun rises from the horizon at a location further to the south of this person located in the north to south middle location of the United States, and the path of the sun is on a curve which is flatter (relative to the horizon) and has a maximum mid-day elevation which is substantially lower then the maximum elevation that is obtained during the summer months. During the period of the mid-seasons of spring and fall, the maximum elevation of the sun is between the elevations for the summer and winter season.

Reference is now made to FIGS. 6A, 6B, 7A, and 7B, with FIGS. 6A and 6B illustrating the panel positioning section 22 arranged for operation at the time of the winter solstice, and FIGS. 7A and 7B illustrating the arrangement of the positioning section 22 for operation during the summer solstice. FIGS. 6A and 7A show the panel 12 at the mid-day time period. It can be seen that in FIG. 6A, the base connecting location 56 is rather close to the main axis of rotation 28, and the linking axis of the linking member 46 has a very small angle relative to the positioning base axis 72.

Now we compare this to FIGS. 7A and 7B, where the base connecting location 56 is at a further forward location, and the position the slant of the linking member 46 is much greater, so that the linking axis 72 is at a greater angle relative to a horizontal plane at the mid-day location. Further, with the panel 12 being in its mid-day location in both FIGS. 6A and 7A, it can be seen that the tilt angle 76 of the panel in its position of FIG. 6A is approximately sixty five degrees, while the tilt angle 77 of the panel 12 in the position of FIG. 7A is approximately forty degrees.

To explain the effect of this, reference is now made to FIGS. 8A, 8B, 8C and 8D which relate to the positioning of the linking member 46 for operation during the winter solstice, and also to FIGS. 9A, 9B, 9C and 9D, which relate to the operation of the system during the summer solstice. FIG. 8A corresponds to FIGS. 6A and 6B and shows the winter setting, where the base connection 56 is much closer to the main axis of rotation 28, and FIG. 9A corresponds to FIGS. 7A and 7B and shows when the summer setting the location of the base connecting location 56 is much further from the main center of rotation 28.

In FIG. 8B, the position of the panel connecting location 58 is shown at twelve different locations as the panel connecting location 58 moves from the early morning setting to the mid-day setting. The eleven lines 82 show the distance of the panel connecting location 58 to the main center of rotation 28, and the length of these lines 82 has a proportional relationship with, and is an indication of, the tilt angle of the panel 12.

In FIG. 8C, the lines 84 center on the main axis of rotation 28, and as panel 12 moves from the early morning position, to the mid-ay position the alignment plane 62 of the panel would be perpendicular to these lines 84 that are radius lines from the main center of rotation 28.

FIG. 8D shows the plotted points 86 that show the actual location of the panel connecting location 58, and the lines 88 which are radially aligned relative to the main axis of rotation 28 are perpendicular to the lateral alignment axis 64 to indicate the lateral alignment of the panel 12.

Now reference is made to FIGS. 9A, 9B, 9C and 9D and these Figs. correspond to FIGS. 8A-8D, but show the position of the linking member 46 and the location of the panel connecting location 58 from the morning position to the mid-day position. It can be seen in looking at FIG. 9B that in the morning position, the connecting location 58 is very close to the main axis of rotation 28. It can also be seen that in the mid-day location the panel connecting location 58 is substantially further from the main axis of rotation 28 than that in the position of FIG. 8C. This would mean that (as shown in FIGS. 6A and 7A) with the arrangement of FIGS. 7A and 9A, the change of the tilt angle of the panel 12 is substantially greater then in the arrangement in the FIGS. of 6A and 8A.

Also, it should be pointed out that in the representations of FIGS. 8B, 8C, 8D, 9B, 9C and 9D the linking member 46 is shown as having the same length. It is true that the length of the linking member 46 does not change. However, as indicated earlier in connection the discussion of FIG. 5, when it is seen in a configuration of a plan view where the view is taken looking downwardly parallel to the main axis of rotation 28, the linking member 46 will be seen as having a shorter length in some locations. Thus, in viewing FIG. 7A, it can be seen that the linking member 46 is at an angle of about forty-five degrees and by the time there has been a rotation of the linking member 46 to the location of FIG. 7B where it has rotated nearly ninety degrees, the panel connecting location 58 is at about the same elevation as the base connecting location 56. However, for the purposes of this description, those relatively minor discrepancies in showing the precise length dimension are not critical to the overall operation of this embodiment, and in any event the FIGS. 11A-F, 12A-F, and 13A-F, these are shown more accurately.

Figure 10:
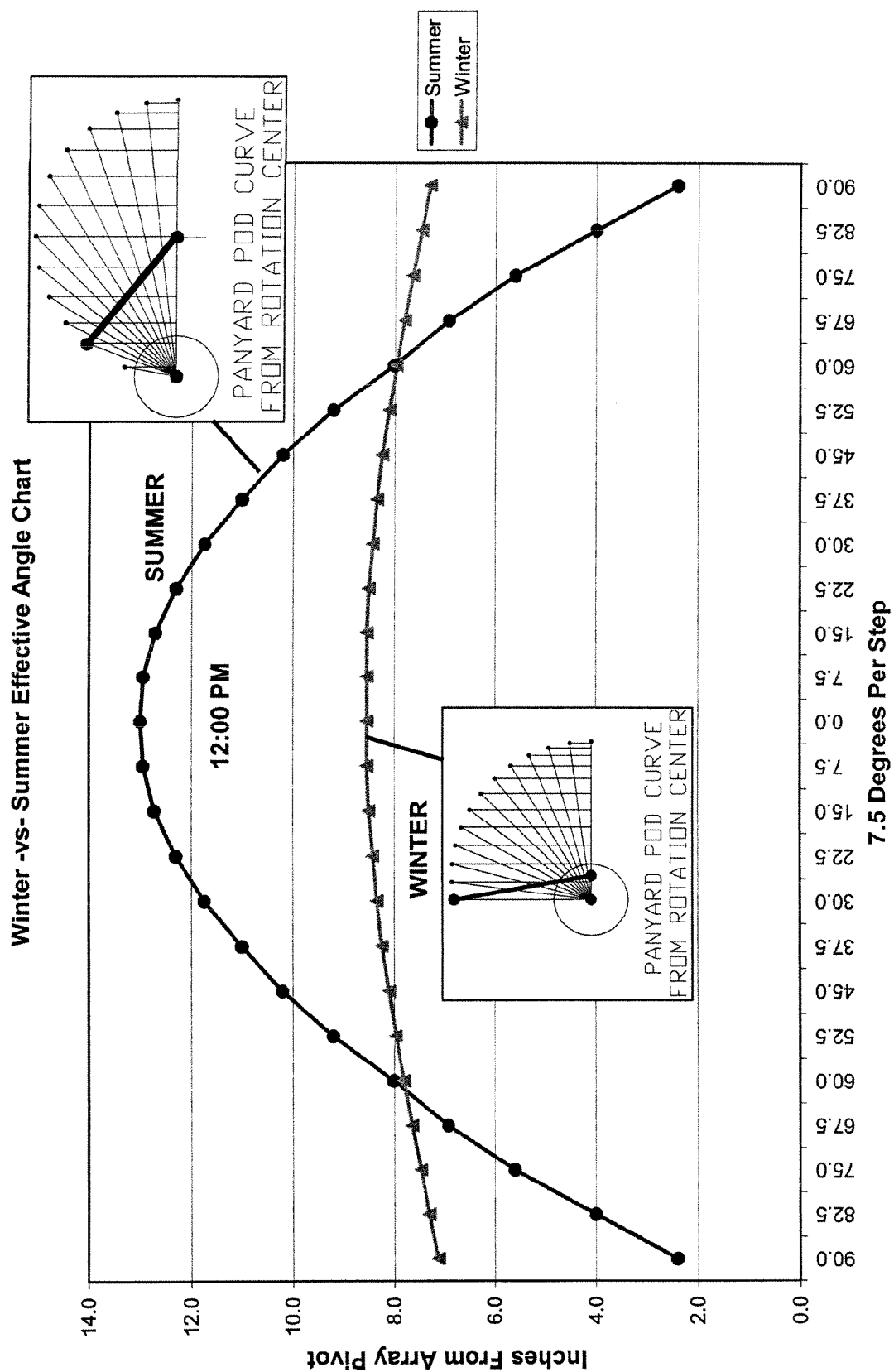
FIG. 10 is a graph illustrating the distance of the panel connecting location to the main axis of rotation throughout a daily cycle from the morning position through the mid-day position and to the end position at the later part of the day, with one curve showing the configuration distances one in the summer configuration and the other showing the same in a winter configuration.

Reference is now made to FIG. 10 which is a graph illustrating the distance of the panel connecting location to the main axis of rotation through a daily cycle from the morning position through the mid-day position and to the end position at the later part of the day. The curve having the circular dots along its length represent these distances when the linking member 46 is in its summer configuration. It can be seen that the distance from the panel connecting location to the main axis of rotation varies to a much larger extent, so that this means a greater amount of angular travel from a relatively steep tilt angle at the morning and late afternoon or evening end locations, and a much lower tilt angle at the mid-day location. On the other hand, the line having the triangular markings along its length represent this distance in the winter setting, and the variation in the tilt angle of the panel is substantially less.

Figure 12B:
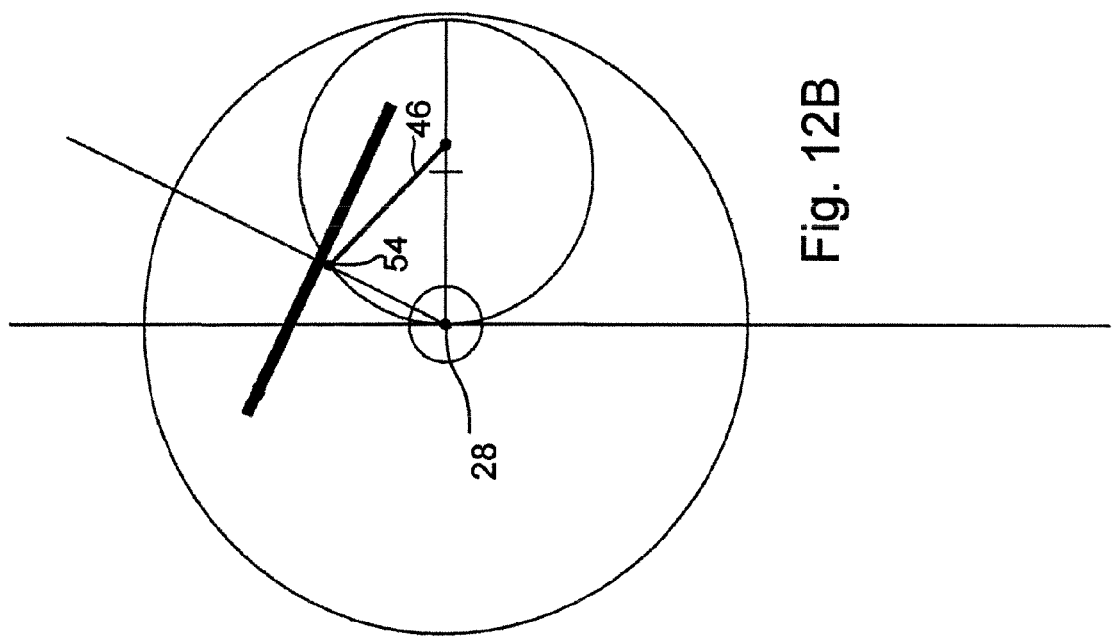

Reference is now made to the six sets of figures in the drawings which correspond to six different positions of the panel 12 and the linking member 46 as the panel 12 moves from its morning location (FIG. 11A) to its mid-day location (FIG. 11F) with the linking member 46 being in its summer location. Thus, FIG. 11F corresponds to FIG. 7A. FIG. 12A corresponds to the left part of FIG. 7B, while the right portion of FIG. 7B corresponds to FIG. 12F. Also, it becomes evident from examining the sequence of the drawings 12A-12F that the positioning of the linking member corresponds rather closely to the positions which are indicated in FIG. 9B. However, there is a difference in that in the sequence of drawings of 12A-12F, there is a more accurate representation of how the "apparent length" of the linking member (this being how the length would appear when viewed from a top plan view) as shown in FIGS. 12A-12F. Thus it will be noted that the linking member 46 in FIG. 12A appears longer than the length of the linking member 46 in FIG. 12F, with the understanding that the length of the linking member remains constant.

From the descriptions given earlier in this text, it is believed that the movement of the panel 12 and of the linking member 46 is evident as the panel 12 travels from its morning location through three intermediate locations to arrive at the mid-day location.

By showing the movement of these different positions, and also showing in FIGS. 13A-13F a tilt angle of the panel 12, it can be seen that the change of the tilt angle relative to the position of the panel through its path of travel from the morning position to the mid-day position tracks rather closely with the elevation of the sun relative to the tilt angle. Thus, the solar axis 68 of the panel 12 is aligned with the direction of the solar rays through the day within a sufficiently close tolerance to optimize the performance of the panel 12.

Reference is first made to FIGS. 11A, 12A, and 13A, these FIGS. 11A, 12A, and 13A each being the first of five additional figures showing the sequence of the movement of the solar panel through a total of six different positions.

In looking at the first set of FIGS. 11A, 12A, and 13A, let's direct our attention first to FIG. 12A where it can be seen that the dark line 12 indicates the orientation of the lateral alignment axis of the panel 12, and it can be seen that panel 12 is facing straight east and (as indicated in FIG. 13A) has a tilt angle of seventy-nine degrees to be facing the rays of the early morning sun. The linking member 46 is positioned so that it extends from its pivot location at 56 to the panel connecting location 58 which is very close to the main axis of rotation 28, this resulting in the rather steep slant angle 79 as shown in FIG. 13A.

It can be seen that the lateral alignment of the solar axis 68 is indicated, with the understanding that its vertical alignment would be perpendicular to the slant angle shown in FIG. 13A.

Figure 13B:
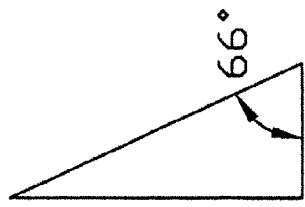
Figure 11B:
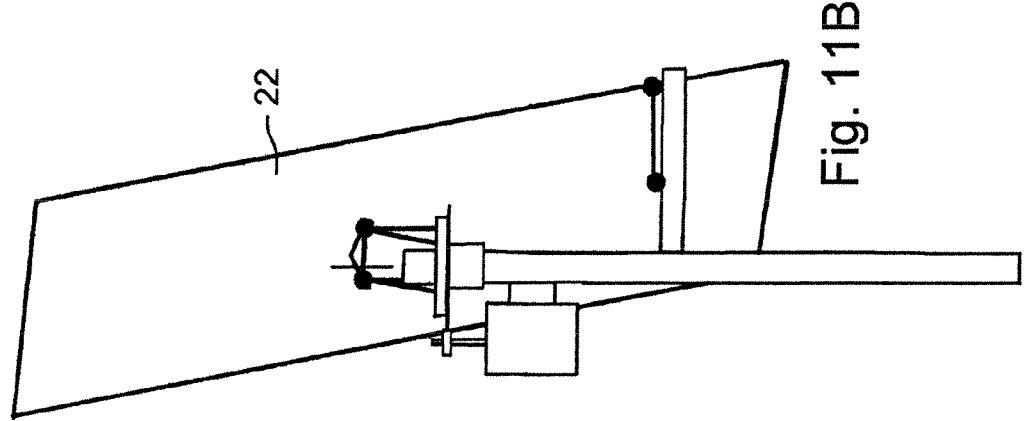
Figure 12C:
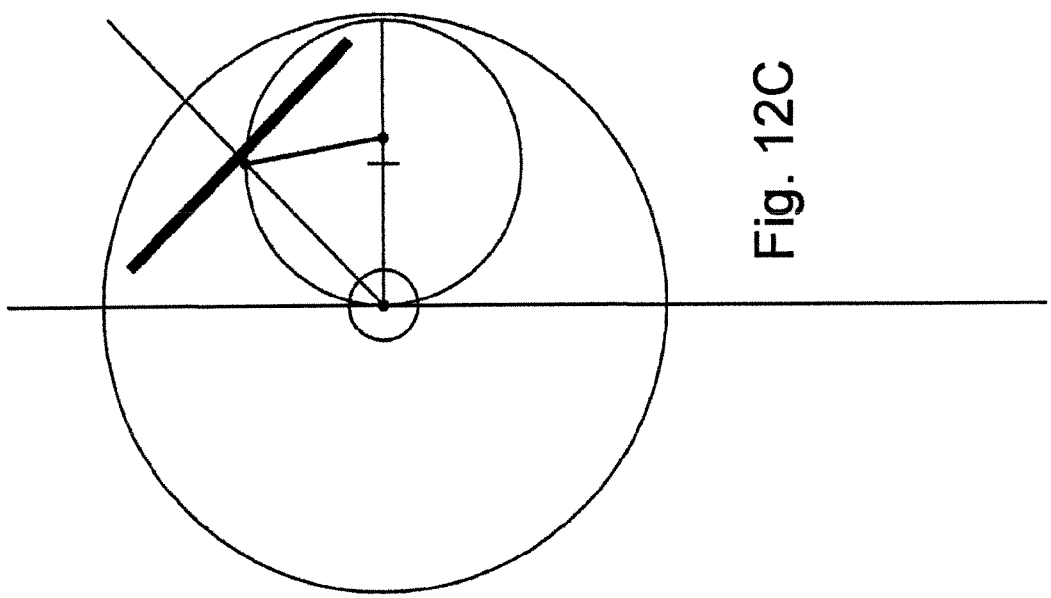
Figure 11C:
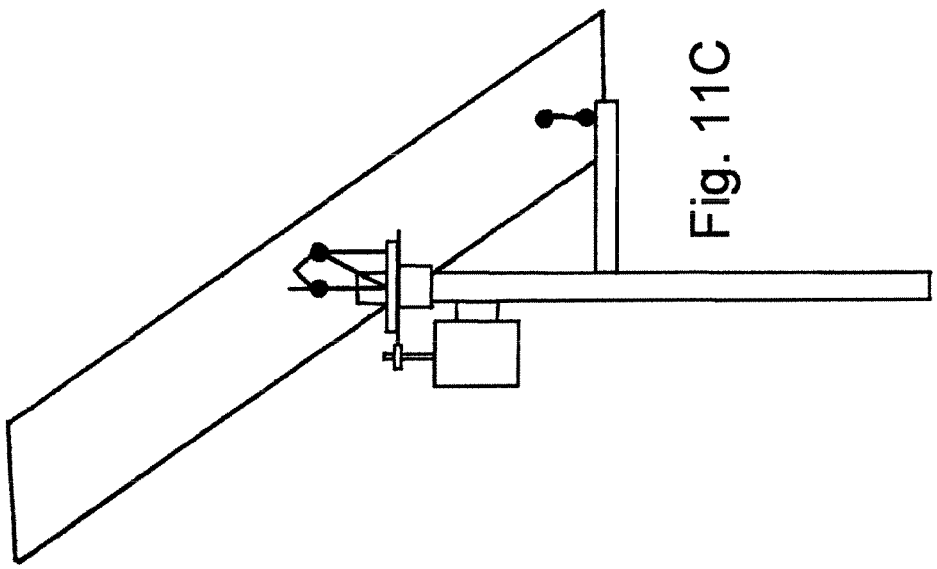
Figure 12D:
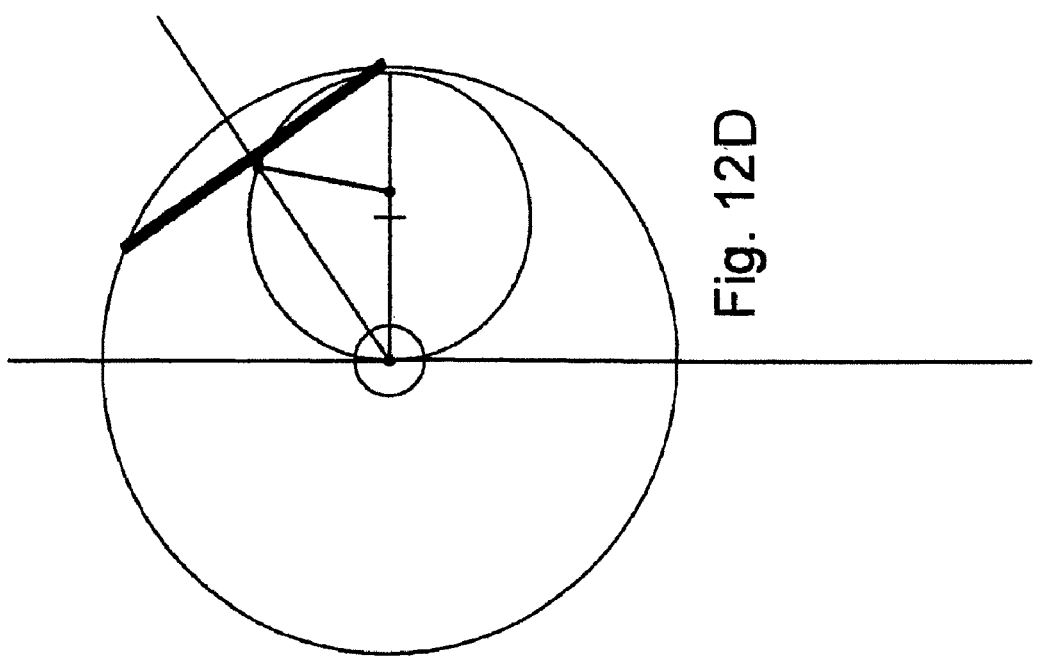
Figure 11D:
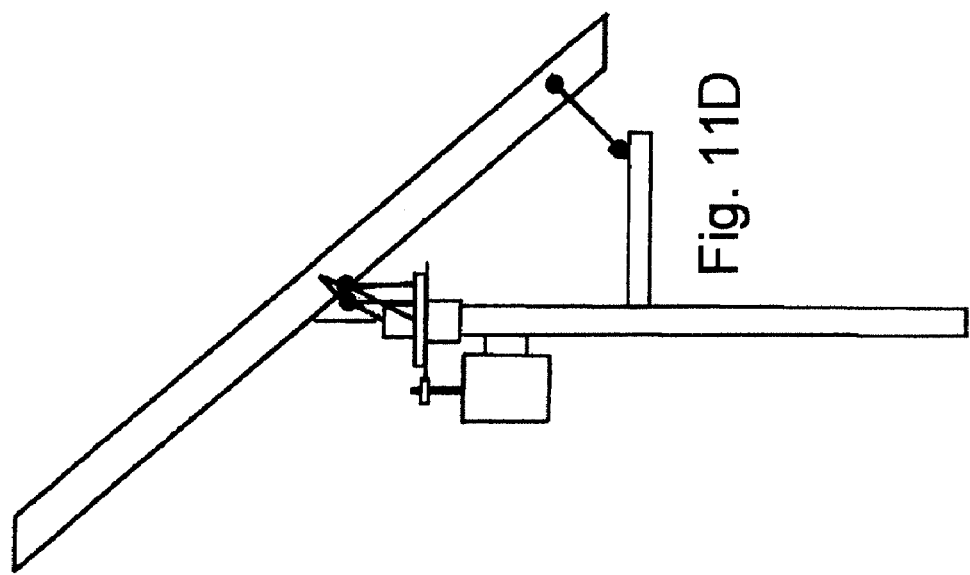
Figure 12E:
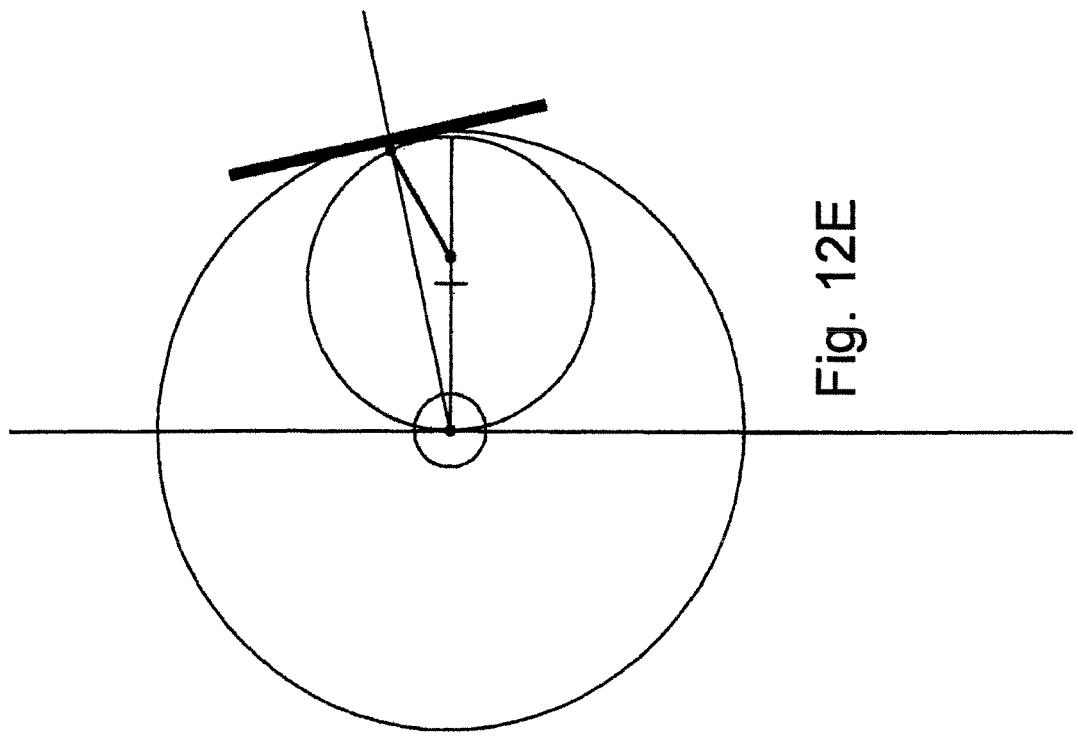
Figure 11E:
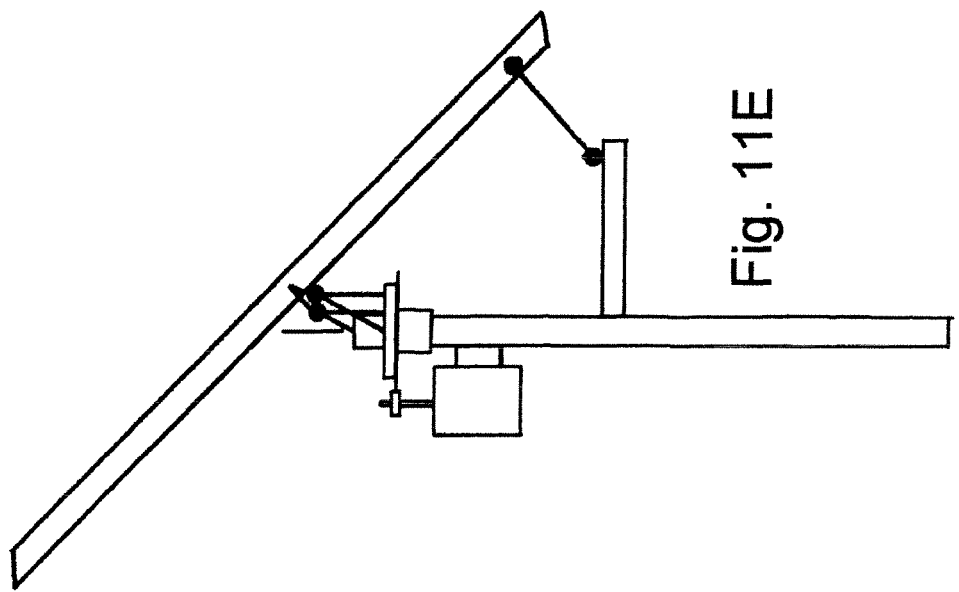

We now move on to the next set of FIGS. 11B, 12B and 13B. It can be seen from viewing FIG. 12B that the panel 12 has been rotated a little over twenty degrees from the position of FIG. 12A, and it can also be seen that this has caused the panel connection 58 of the linking member 46 has moved a substantial distance away from the center of rotation 28, this resulting in the tilt angle being decreased from seventy-nine degrees down to sixty-six degrees. As we proceed further through the next two sets of figures, namely FIGS. 11C, 12C and 13C and also FIGS. 11D, 12D, and 13D, the tilt angle has decreased from sixty-six degrees to fifty-four degrees (FIGS. 11-13C) to fifty degrees in FIG. 13D. Coincidentally, the lateral alignment of the panel 12 at 68 is about fifty degrees from straight east.

Figure 13C:
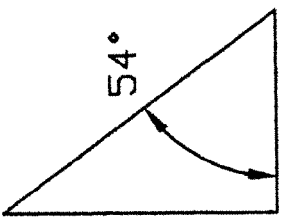
Figure 13D:
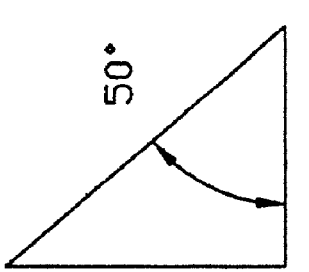
Figure 13E:
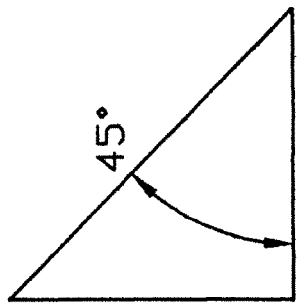
Figure 13F:
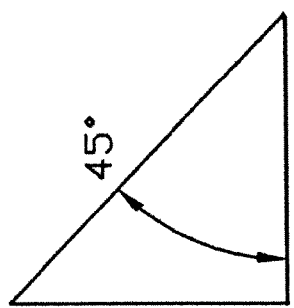
Figure 12F:
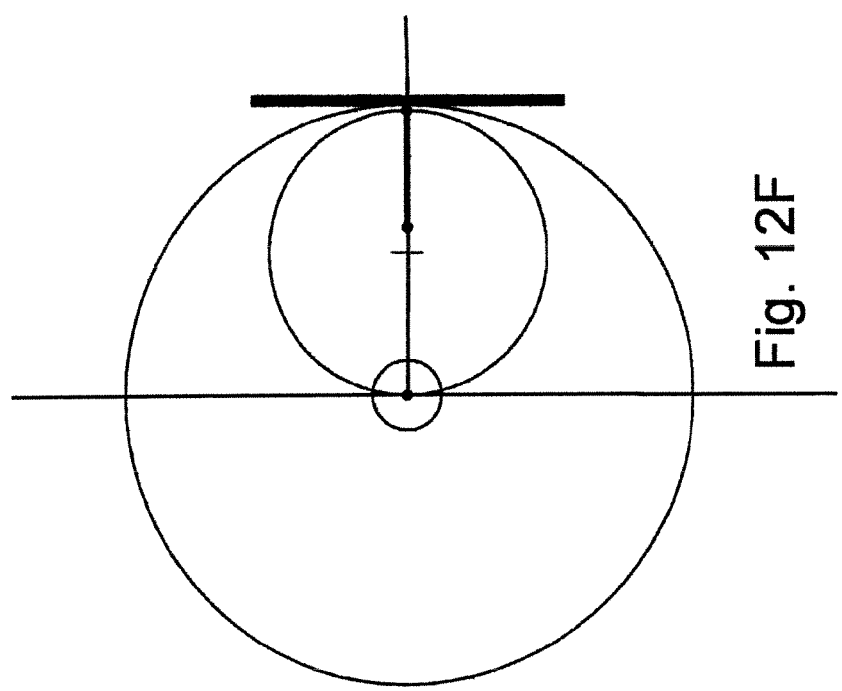
Figure 11F:
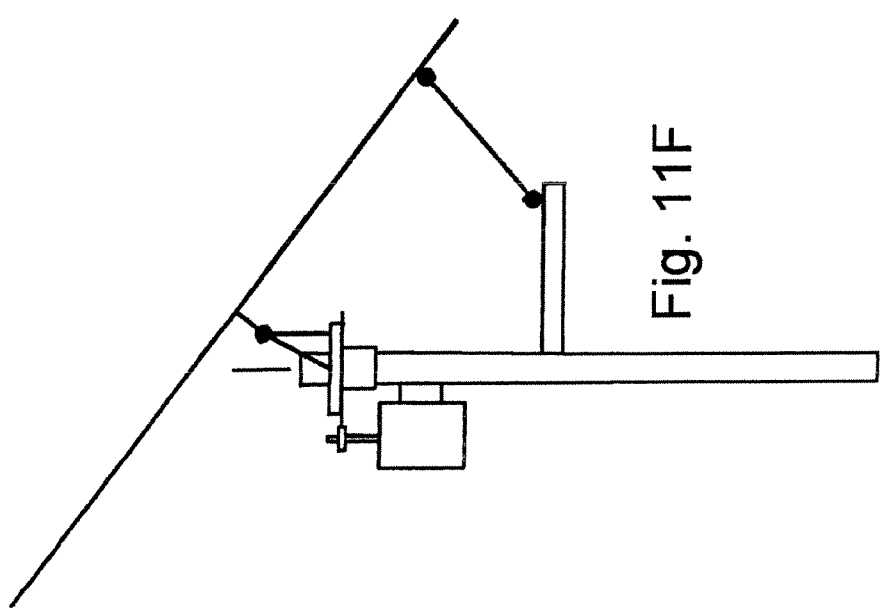

Then to travel from FIGS. 11D, 12D and 13D to 11F, 12F and 13F, the tilt angle has been changed from fifty degrees (FIG. 13D) to nearly forty-five degrees (FIG. 13E) and to a full forty-five degrees (FIG. 13F), and in the position of FIG. 13F, the lateral alignment of the solar axis 68 is now directed toward the sun in the mid-day location of the panel 12.

Figure 14:
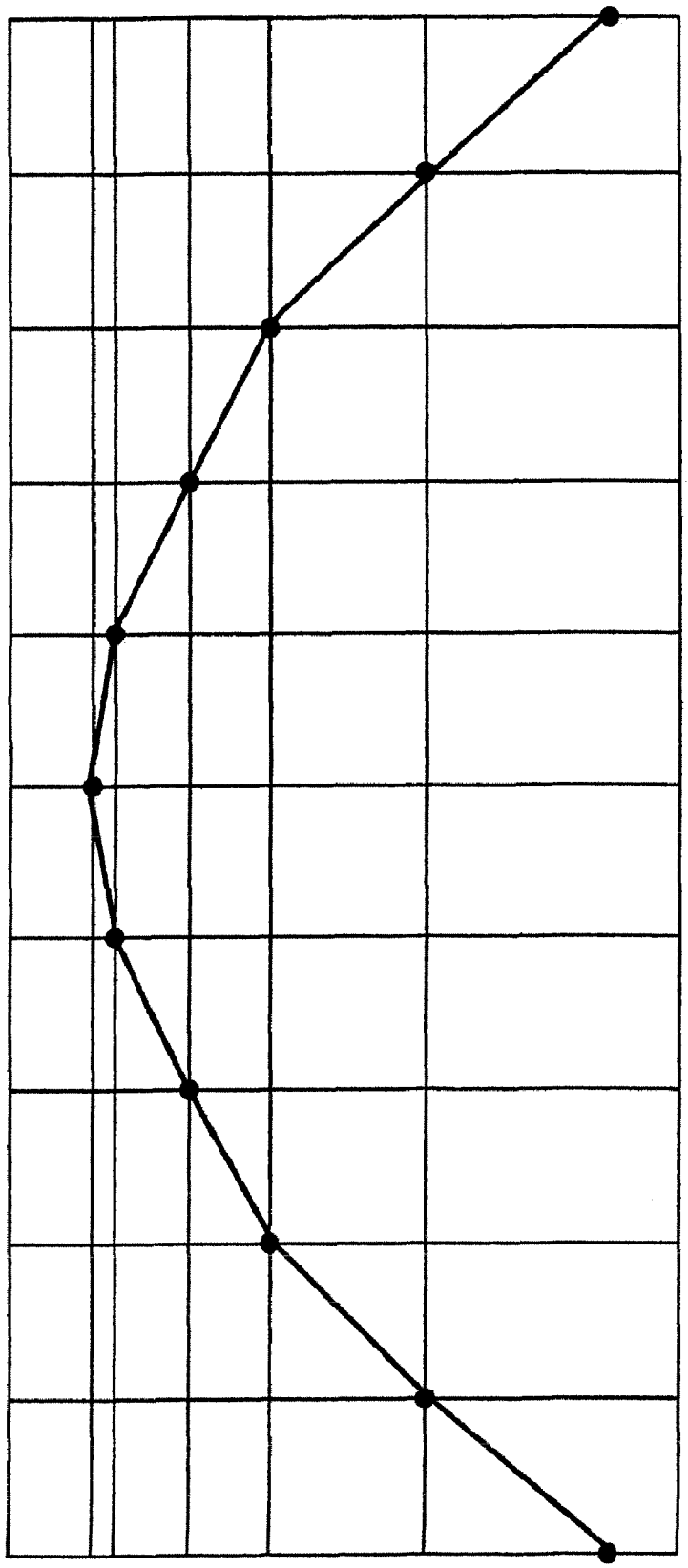
FIG. 14 is a graph illustrating the effective tilt angle of the panel beginning in the morning position and traveling to the end of day position where the positioning section has the linking member in its summer position.

The graph of FIG. 14 illustrates the pattern of the tilt angle increasing toward mid-day and decreasing later in the day.

A second embodiment of the present invention will now be described with reference to FIG. 15. Components of this second embodiment which are similar to (or the same as) components of the first embodiment will be given like numerical designations, with an "a" suffix distinguishing those of the first embodiment.

In this second embodiment, the panel 12, the mounting section 16, and the drive section 18 are, or may be, the same as, or similar to, these same components which would be present in the first embodiment. Accordingly, these components are not shown in FIG. 15.

Figure 15:
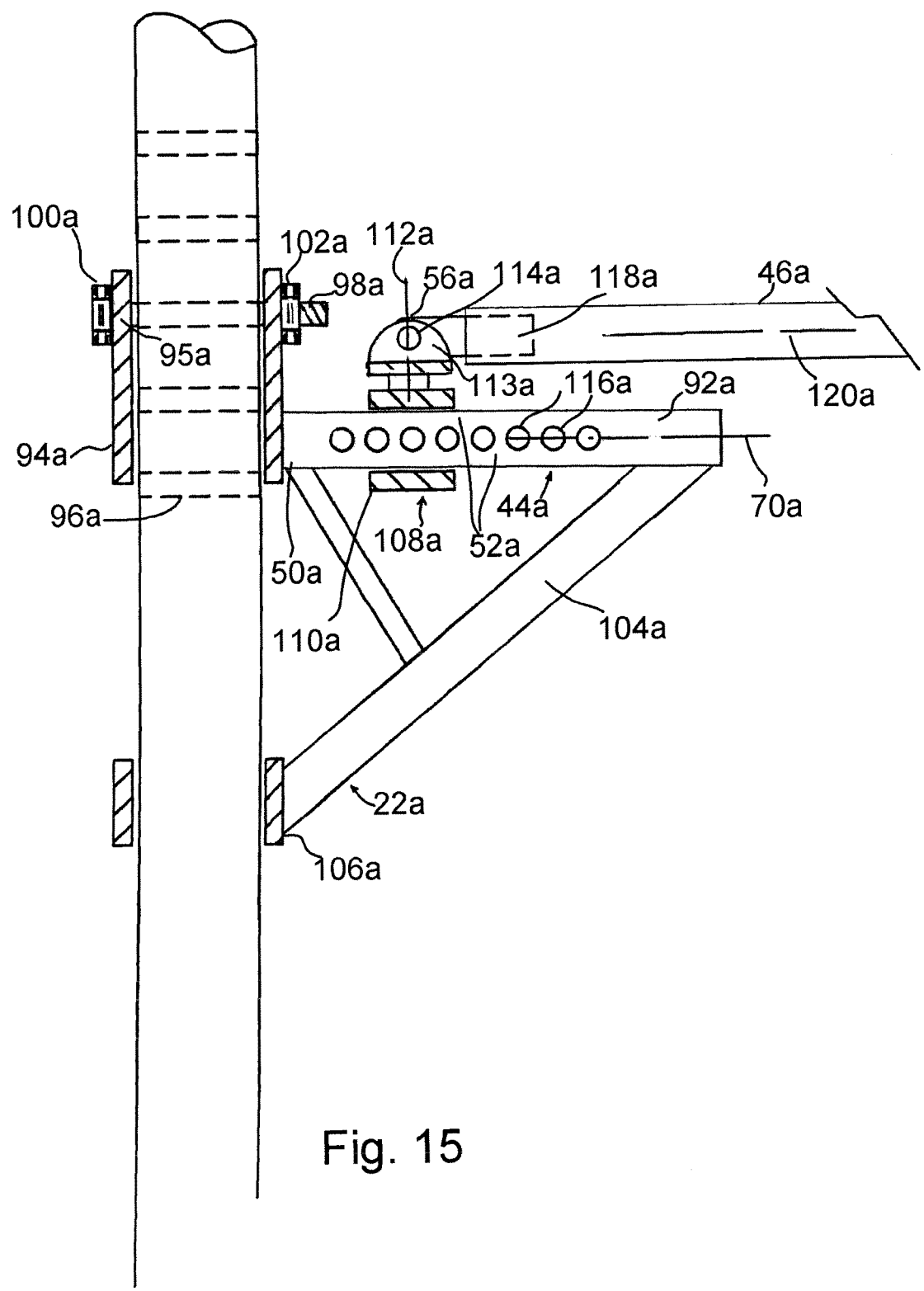
FIG. 15 is a side elevational view of a portion of the apparatus illustrating a second embodiment of the invention.

In FIG. 15, the panel positioning section 22a of the second embodiment differs from the panel positioning section 22 of the first embodiment in a manner that in addition to being able to position the base connecting location 56a at various horizontal locations along the base axis 70a, it can also be located at various height locations. To accomplish this the positioning base member 44a of the second embodiment is designed so that its connection to the pole 14a is such that it can be fixed to the pole 14a at various vertical locations.

The positioning base member 44a comprises a horizontal member 92a, which connects to a cylindrical sleeve 94a that fits around the pole 14a with a sufficiently close tolerance to make a firm connection. The pole 14a is formed with a plurality of vertically spaced, diametrically aligned openings 96a along its length, and the sleeve 94a has matching openings 95a and has a connecting bolt 98a which fits through the openings 96a in the pole 14a. There is a head 100a at one end of the bolt 98a and a nut 102a shown threaded onto the end of the bolt 100a to hold the bolt 98a in place and thus fix the sleeve 94 in place.

The positioning base member 44a is also provided with a brace 104a that has an upper front end connecting to the member 92a and connecting at its lower rear end to a second sleeve 106a which has an sufficiently close tolerant fit relative to the pole 14a to form a secure bracing location. Also, the rear portions of the member 92a and the brace 104a may be connected by a strut 105a to add structural strength.

The connection of the bolt 92a with both the sleeve 94a and the pole 14a prevent rotation of the positioning base member 44a about the main axis of rotation 28a.

In the first embodiment, it was indicated that the base connection 56a was moveable along the length of the connecting region 52a of the positioning base member 44a. In this second embodiment, the linking member 46a also has a connection 56a which can be located at various positions along the connecting region 52a of the positioning base member 44a. In FIG. 15 this is shown in more detail. The connection 56a comprises a connecting mounting portion 108a which comprises a sleeve 110. A member 111a is mounted to the sleeve 110a for rotation about a vertical axis 112a, and the member 111a has a pair of upstanding ears 113a that in turn connect to a pivot pin at 114a.

Thus the linking member 46a can, as the first embodiment, rotate along a horizontal axis transversely aligned to the main axis of rotation 28a, and also rotate about a vertical axis 112a which lies in a plane which would be parallel to (or coincident with) the main axis of rotation 28a. The term linking member is not intended to be limited to a "link" in the form of an elongate rod, but is intended to refer to a member having the two connecting locations with two connecting locations at a constant distance from one another, with no specific shape except to be able to have adequate clearance during operation.

The connecting location 56a of the linking member 46a can be changed by moving the sleeve 110a along the length of the member 92a. The sleeve 110a is provided with a pair of diametrically opposed through openings, as is the sleeve 94a, and there is a plurality of through openings 116a located at space locations along the axis 70a of the member 92a. Thus, the sleeve 110a can be placed in a selected position along the length of the member 92a and aligned with a pair of the openings 106a, with a bolt being inserted through the matching openings to maintain the sleeve 110a in the proper position, and to prevent relative rotation of the sleeve 110a about the axis 70a.

Also, it is evident that the vertical position of the connecting location 56a could be moved upwardly and downwardly by moving the sleeve 94a upwardly and downwardly on the pole 14a. Also, the linking member 46a is able to have a rotating connection (indicated at 118a) by which this linking member 46a could be rotated about a lengthwise axis 120a of the linking member 46a. This rotatable connection 118a could be useful in the event that the forward connection to the panel 12 may be such that rotational movement of the linking member 46a about this axis 72a would be necessary.

To discuss now the functioning of this second embodiment, as indicated above, the rear connecting location 56a can be positioned on the base member 44a at locations that can be changed vertically and horizontally from positions that are nearer to, or further from, the main axis of rotation 28a, and at higher or lower elevations. Thus, it can be seen, that in the position of FIG. 7A, for example, the connecting location 56a could be moved upwardly a moderate amount and also rearwardly so that the panel 12 would remain in the mid-day location at the same angle. But when the panel connection 58 moves to its furthest rearward position, it would be located somewhat further rearwardly than in the configuration shown in FIG. 7A.

In general, the alignment axis 72 of the linking member 46 of the first embodiment and the axis 72a of the member 46a of the second embodiment are positioned in a manner that the movement of the panel connection 58 or 58a would be in a path having a substantial horizontal alignment component during a substantial portion of its travel path in moving between the two end locations and through the mid-day location. This alignment component would be such that the path of travel having the horizontal vector aligned with the path of travel would for at least for about 40%, 50%, 60%, 70%, 80%, 90% or 100% of its total path of travel no greater than about one half of a right angle from the horizontal. In a more limited range the horizontal alignment component would be no greater than about one half of a right angle, one quarter of a right angle, or one fifth of a right angle.

Also, the slant of the axis 72 or 72a of the linking member 46 or 46a taken from the base connecting location 56 or 56a to the connecting location 58 or 58a would be such that through a substantial portion of the path of travel of the linking member 46 or 46a, the angle that the linking member 46 or 46a makes with the horizontal would be no greater than a one half of a right angle, in a more limited range one third of a right angle, one fourth of a right angle, one fifth of a right angle, and also an alignment component no greater than about five degrees or ten degrees from the horizontal.

Figure 16:
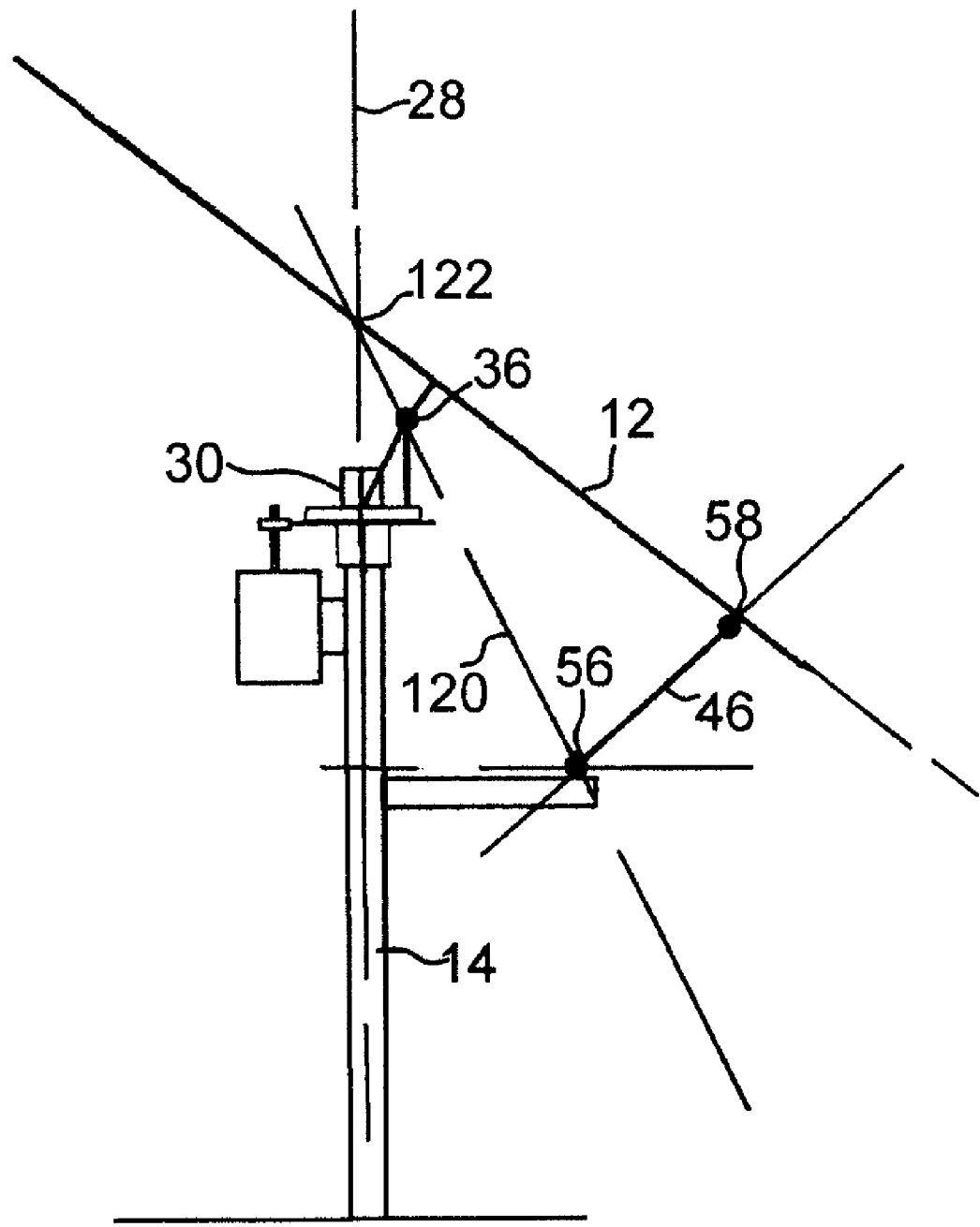
FIG. 16 is a somewhat schematic side elevational view illustrating certain operating principals of the embodiments of the invention.

To analyze further some of the functional relationships of these embodiments of the invention, reference will now be made to FIGS. 16, 17, and 18. It will be seen that FIG. 16 is substantially the same as FIG. 11F and the panel 12 is in its mid-day position. However, there are only some numerical designations. It can be seen that there is the panel 12, the main axis of rotation 28, the pole 14, the first and second pivot connections 56 and 58, the mounting section 30 and the axis of rotation 36 about which the panel 12 rotates. In addition, there is a line 121 which is drawn from the first pivot location 56, upwardly through the horizontal axis of rotation 36 of the panel 12, and continuing upwardly along the same line 121 to a point of intersection at 122 of the main axis of rotation 28 and the line 120.

Now, let us examine the relationship between the pivot point 56, the pivot point 58 and the point of intersection 122. As indicated previously, the point 56 is at a fixed location. The pivot point 58 is movable, but is at a fixed distance from the pivot point 56, and also at a fixed distance from the axis of rotation 36. Also, the distance from the pivot point 56 to the axis of rotation 36 is fixed. Therefore the locations 56, 58 and 36 form a rigid triangle.

For purposes of analyzing the functions that will be described later herein, we will make the assumption that the axis of rotation 36 is positioned so that it actually intersects the main axis of rotation 28. As it is presently designed, this axis 36 is spaced a fairly short distance away from the main vertical axis 28. However, this relatively minor variance is not that significant as it relates to the analysis which is to follow. Thus, for purposes of the present analysis, we shall consider the location 122 as a fixed location as if the horizontal axis of rotation 36 were intersecting the main vertical axis 28.

Figure 17:
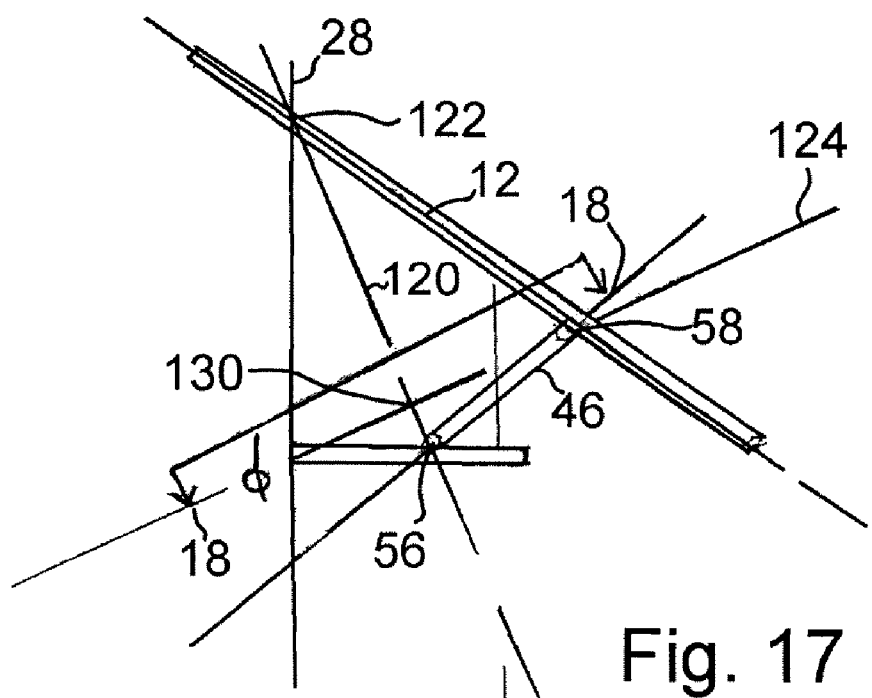
FIG. 17 is a schematic view somewhat similar to FIG. 16 and illustrating operating features of the embodiments of the invention.
Figure 18:
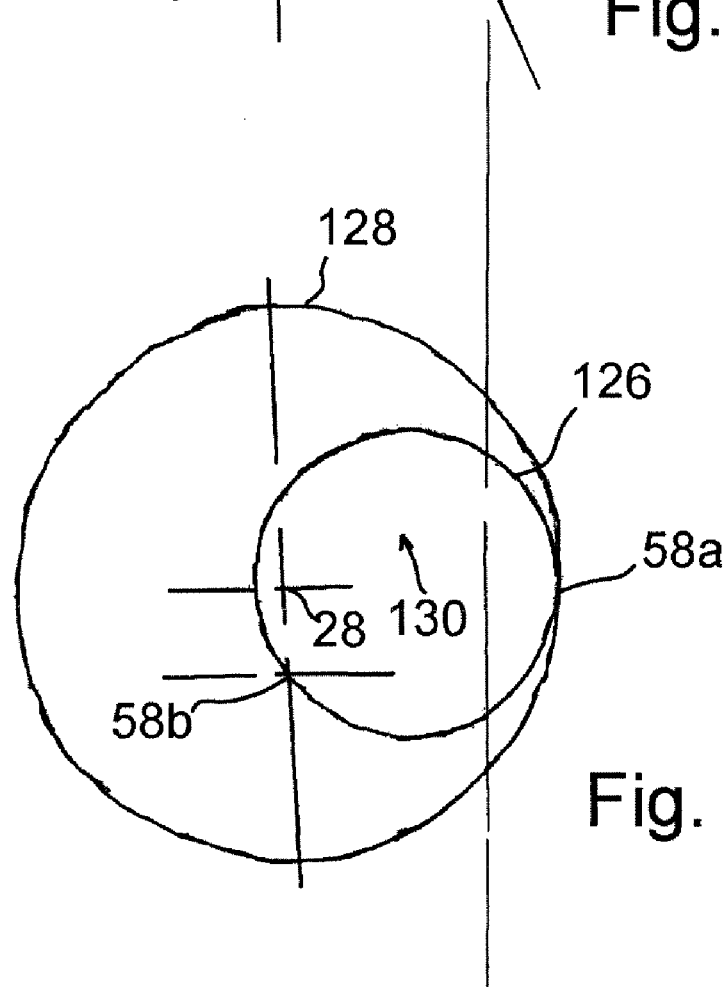
FIG. 18 is a sectional view taken along line 18-18 of FIG. 16.

With that introduction being given, we will now make reference to FIG. 17 which is more of a schematic drawing showing only the components and alignment lines that are necessary for the explanation which is to follow. Let us first examine the manner in which the panel 12 is caused to rotate from the mid-day position of FIG. 17 to a end of the day location. As the mounting member 30 rotates through a full ninety degrees of rotation, it will cause the rotation of the second pivot location 58 by which the panel 12 is connected to the first pivot location 36. With the points 56 and 122 being at fixed locations, and with the linking member 46 being at the same length, as indicated previously, the points 56, 58 and 122 form a rigid triangular component. The three sides of the triangle are the panel 12, the linking member 46, and the line 120 between the two fixed locations 56 and 122. Thus, it can be seen that the line 120 extending between the points 56 and 122 is a fixed portion of the triangle, and that the point of the triangle which is moving is the second outer pivot connection 58.

Also, analysis would indicate that the circular path of travel of the second pivot location 58 would lie in a plane (indicated at 124 in FIG. 17) which is perpendicular to the line 120. This path of travel of the second pivot location 58 traveling in the plane 124 is along the circular line indicated at 126 in FIG. 18. The outer circular line 128 in FIG. 18 shows a path of travel which would occur if the panel 12 were rotating about the axis 28 if it were maintaining the same angular orientation relative to the main axis 28 so that a line tangent to the outer circular line 28 indicates the alignment of the horizontal axis of the panel 12. The movement of the linking member 46 dictates the path of travel of the outer pivot location 58 along the curved path indicated at 126. The effect of this is that when the panel 12 has rotated a full ninety degrees in its path of travel in rotating about the main axis 128, the location of the pivot connection 58 would be at the end location 58b which is a relatively short distance from the main center of rotation 28. That would place the panel 12 in either its sunset position or its sunrise position.

As indicated earlier in this portion of this text dealing with this analysis, there is some inaccuracy in this analysis due to the offset of the axis of rotation from the main axis of rotation 28. However, since this axis 36 does rotate along with the rotation of the panel 12, this offset of the location 36 merely shifts the point 122 away from the main axis of rotation 28 a short distance. That would result in something of a "wobble" of the line 120 at the upper end portion, but that would not cause a substantial departure from the positioning that would occur if this were not the case.

Thus, it becomes apparent that various techniques could be used to accomplish different mid-day alignments and also morning and evening alignments of the panel 12 or 12a which in turn would dictate the various alignment positions along the path of travel of the panel. The radial distance of the first pivot connection 56 from the main axis of rotation 28 dictates the location of the center of rotation of the path of travel of the point 58, and the distance from the outer point 58 to the center 130 which is at the intersection of the line 120 with the plane 124 is the radius about which the outer pivot point 58 rotates.

Therefore, let it be assumed that the tilt angle of the panel 12 is to be at a particular slant at mid-day, and at a second slanted position in the morning and evening hours. With reference to FIG. 17, the two desired locations of the panel 12 could be drawn on a diagram such as shown in FIG. 17. Therefore, it is evident that at the mid-day location the point 58 is already at a predetermined location on the panel. The next step is to select the center of rotation at 56 so that when the panel moves a full ninety degrees from the mid-day position to the evening position, the point 58 will move from the location at 58a to the position at 58b, for example, as shown in FIG. 18. Therefore, the center of rotation 130 would have to be positioned so that there is a circular path from the locations 58a to 58b (FIG. 18) so that the panel at the location at 58b would have the proper tilt angle. Therefore, the center location 130 would be moved along a forward to rear line until there would be a match of the location 58b to get the proper slant to the panel 12. Also, it is evident that this could be accomplished not only by moving the fixed pivot location 56 either forwardly or rearwardly, but also by changing the length of the linking member 46, and also moving the fixed location upwardly and downwardly.

It is evident that various modifications could be made without departing from the basic decisions of the present invention.

Therefore I claim:

1. A solar tracking system comprising:
   a) a solar panel having;
      i) a front surface region;
      ii) a panel alignment plane;
      iii) tilt angle alignment axis;
      iv) a lateral angle alignment axis; and
      v) a solar alignment axis which is perpendicular to and extends forwardly from said panel alignment plane;
   b) a support base;
   c) a panel mounting section mounted to said support base at a mounting location for rotation about a generally vertical main axis of rotation, said panel being mounted to said panel mounting section to be able to rotate about a generally horizontal secondary panel axis of rotation, so as to be moveable along a path of travel from a morning location through a morning transition path portion to a mid-day location, and from the mid-day location through an afternoon transition path location to an end location;
   d) a panel positioning section comprising:
      i) a base positioning section having a forwardly extending base connecting region located generally forwardly of said main axis of rotation;
      ii) an intermediate rigid linking section having a rear connecting positioning portion to pivotally connect at a rear connecting positioning location at the base connecting region of the base positioning section and having a forward connecting positioning location to connect to said panel at a forward panel connecting positioning location to provide a position linking connection between said positioning base section and said panel along a linking axis extending between said rear connecting positioning location and said forward panel connecting positioning location, said intermediate linking section being structurally rigid between said rear and forward connecting positioning locations to maintain said front and rear connecting positioning locations at a constant distance from one another and to resist both extension and compression forces along the linking axis;
      iii) wherein the rear connecting positioning location is fixed relative to the support base as the panel mounting portion rotates in a vertical and a horizontal plane from the morning location through the morning transition path portion to a mid-day location, and from the mid-day location through the afternoon transition path location to an end location; and
   e) said system being characterized in that with said system being in an operating mode to move said panel, which is connected to said forward panel connecting location, through said path of travel, the panel travels around said vertical axis of rotation, through the morning transition path portion, through the midday location and through the afternoon transition path portion to the end location, with the forward panel connection of the intermediate positioning linking section operating in a manner to rotate the panel about the horizontal axis of rotation so that the panel alignment plane is tilted so that the solar alignment axis is directed toward the sun.

2. The solar tracking system of claim 1, wherein said base positioning section is located so that the base connecting region is located at an elevation below said generally horizontal panel secondary axis of rotation.

3. The solar tracking system of claim 2, wherein the forward connecting positioning location of the panel is at an elevation below said generally horizontal panel axis of rotation during a substantial portion of the path of travel of the panel.

4. The solar tracking system of claim 1, wherein the forward connecting positioning location of the panel is at an elevation below said generally horizontal panel axis of rotation during a substantial portion of the path of travel of the panel.

5. The solar tracking system of claim 2, wherein said base connecting region has a plurality of fixed connecting locations for said rear connecting positioning portion of the intermediate positioning section so that the rear connecting positioning portion can be selectively connected to the base connecting region at different distances from the main axis of rotation, so that the change of distance of the forward panel connecting positioning location from the main axis of rotation in moving between morning and mid-day positions can be made greater or smaller so that the solar panel is better able to track the position of the sun depending upon the height of the sun in the sky at mid-day.

6. The solar tracking system of claim 1, wherein the base connecting region of the base positioning section is operatively configured to be positioned at higher and lower elevations.

7. The solar tracking system of claim 1, wherein the intermediate positioning section has a fixed operating length so that the rear connecting positioning location and the forward connecting positioning location remain at a constant distance from one another during operation.

8. The solar tracking system of claim 7, wherein the intermediate positioning section has an adjustable length so that the fixed operating length can be adjusted to longer and shorter lengths so that the constant distance of different operating periods can be changed.

9. The solar tracking system of claim 1, wherein the horizontal secondary axis of rotation remains at a fixed angular orientation relative to the main axis of rotation during operation so as to have a fixed angular position relative to the main axis of rotation so that the horizontally extended tilt axis of the panel remains at the same orientations throughout the travel panel path of the panel with a connecting location of the panel to the panel mounting section remaining substantially constant, and the rear connecting positioning location at the base connecting region remaining at a stationary location that is spaced from the main axis of rotation, so that the linking axis has a lateral component of rotational movement during the path of travel of the panel to control tilt angle of the panel to orient the panel relative to the elevation of the sun on its path of travel by moving the forward panel connecting positioning location closer to or further from the main axis of rotation.

10. The solar tracking system as recited in claim 1, wherein said support base has a vertical alignment component at or adjacent to the substantially vertical main axis of rotation, and said base positioning section is connected to support base and extends generally forwardly therefrom with the connecting region extending generally forwardly from the main axis of rotation in a forward direction.

11. The solar tracking system of claim 1, wherein there is a power source to rotate said panel about the main axis of rotation along its path of travel.

12. A solar tracking system comprising:
a) a solar panel having;
   i) a front surface region;
   ii) a panel alignment plane;
   iii) tilt angle alignment axis;
   iv) a lateral angle alignment axis; and
   v) a solar alignment axis which is perpendicular to and extends forwardly from said panel alignment plane;
b) a support base;
c) a panel mounting section mounted to said support base at a mounting location for rotation about a generally vertical main axis of rotation, said panel being mounted to said mounting section to be able to rotate about a generally horizontal secondary panel axis of rotation which is substantially perpendicular to said main axis of rotation, so as to be moveable along a path of travel from a morning location through a morning transition path portion to a mid-day location, and from the mid-day location through an afternoon transition path location to an end location;
d) said system having a mid-day vertical alignment reference plane which, with the panel in the mid-day location, is substantially coincident with both the main axis of rotation and the solar alignment axis;
e) a panel positioning section comprising:
   i) a base positioning section having a forwardly extending base connecting region located generally forwardly of said main axis of rotation;
   ii) an intermediate positioning section having a rear connecting positioning portion to connect at a rear connecting positioning location at the base connecting region of the base positioning section and having a forward connecting positioning location to connect to said panel at a forward panel connecting positioning location to provide a position linking connection between said positioning base section and said panel along a linking axis extending between said rear connecting positioning location and said forward panel connecting positioning location;
f) said main axis of rotation, said horizontal panel axis of rotation, said rear connecting position location and said forward panel connecting position location being positioned relative to one another so that with the panel at the mid-day position, the rear connecting positioning location, the forward panel connecting pivot location and the linking axis are in relatively close alignment with one another relative to a mid-day vertical alignment reference plane which is substantially parallel to the solar alignment axis at mid-day, and as the panel moves further along its path of travel closer to its end location, the panel forward connecting positioning location moves, relative to angular location about said main axis of rotation, so that the linking axis goes out of angular alignment with said mid-day vertical alignment reference plane so that the panel forward connecting positioning location is closer to said main axis of rotation and thus increases the tilt angle of the panel;

g) wherein the rear connecting positioning location is fixed relative to the support base as the panel mounting portion rotates in a vertical and a horizontal plane from the morning location through the morning transition path portion to a mid-day location, and from the mid-day location through the afternoon transition path location to an end location; and h) said forward panel connecting positioning location having, with the panel moving from its morning position to its end position a substantial horizontally aligned vector component of travel for at least about fifty percent of its total path of travel.

13. The solar tracking system as recited in claim 12, wherein the horizontally aligned vector component would be for at least as great as about seventy percent of the total path of travel.

14. The solar tracking system as recited in claim 12, wherein the horizontal vector component comprises an angle with the horizontal no greater than one half of the right angle.

15. A solar tracking system comprising:
a) a solar panel having;
   i) a front surface region;
   ii) a panel alignment plane;
   iii) tilt angle alignment axis;
   iv) a lateral angle alignment axis; and
   v) a solar alignment axis which is perpendicular to and extends forwardly from said panel alignment plane;
b) a support base;
c) a panel mounting section mounted to said support base at a mounting location for rotation about a generally vertical main axis of rotation, said panel being mounted to said mounting section to be able to rotate about a generally horizontal secondary panel axis of rotation which is substantially perpendicular to said main axis of rotation, so as to be moveable along a path of travel from a morning location through a morning transition path portion to a mid-day location, and from the mid-day location through an afternoon transition path location to an end location;
d) said system having a mid-day vertical alignment reference plane which, with the panel in the mid-day location, is substantially coincident with both the main axis of rotation and the solar alignment axis;
e) a panel positioning section comprising:
   i) a base positioning section having a forwardly extending base connecting region located generally forwardly of said main axis of rotation;
   ii) an intermediate positioning section having a rear connecting positioning portion to connect at a rear connecting positioning location at the base connecting region of the base positioning section and having a forward connecting positioning location to connect to said panel at a forward panel connecting positioning location to provide a position linking connection between said positioning base section and said panel along a linking axis extending between said rear connecting positioning location and said forward panel connecting positioning location;

f) said main axis of rotation, said horizontal panel axis of rotation, said rear connecting position location and said forward panel connecting position location being positioned relative to one another so that with the panel at the mid-day position, the rear connecting positioning location, the forward panel connecting pivot location and the linking axis are in relatively close alignment with one another relative to a mid-day vertical alignment reference plane which is substantially parallel to the solar alignment axis at mid-day, and as the panel moves further along its path of travel closer to its end location, the panel forward connecting positioning location moves, relative to angular location about said main axis of rotation, so that the linking axis goes out of angular alignment with said mid-day vertical alignment reference plane so that the panel forward connecting positioning location is closer to said main axis of rotation and thus increases the tilt angle of the panel;

g) wherein the rear connecting positioning location is fixed relative to the support base as the panel mounting portion rotates in a vertical and in a horizontal plane from the morning location through the morning transition path portion to a mid-day location, and from the mid-day location through the afternoon transition path location to an end location; and h) said linking axis of the intermediate positioning section being at any time no greater than one half of a right angle from the horizontal.

16. The system as recited in claim 1, wherein the horizontal secondary panel axis is positioned forwardly of the main axis of rotation when the panel is at the midday location.

17. A solar tracking system comprising:
 a) a solar panel having;
  i) a front surface region;
  ii) a panel alignment plane;
  iii) tilt angle alignment axis;
  iv) a lateral angle alignment axis; and
  v) a solar alignment axis which is perpendicular to and extends forwardly from said panel alignment plane;
 b) a support base;
 c) a panel mounting section mounted to said support base at a mounting location comprising a substantially vertical main axis of rotation, said panel being mounted to said panel mounting section comprising a substantially horizontal secondary panel axis of rotation;
 d) a panel positioning section comprising:
  i) a base positioning section comprising a forwardly extending base connecting region located forward of said main axis of rotation;
  ii) an intermediate linking section comprising a first end fixedly and rotatably coupled to the base positioning section and a second end fixedly and rotatably coupled to the solar panel said intermediate linking section being structurally rigid between said rear and forward connecting positioning locations to maintain said front and rear connecting positioning locations at a constant distance from one another and to resist both extension and compression forces along the linking axis as the solar panel rotates in the vertical and the horizontal plane; and
 e) wherein said system being characterized in that with said system being in an operating mode to move said panel, which is connected to said forward panel connecting location, through said path of travel, the panel travels around said vertical axis of rotation, through the morning transition path portion, through the midday location and through the afternoon transition path portion to the end location, with the forward panel connection of the intermediate positioning linking section operating in a manner to rotate the panel about the horizontal axis of rotation so that the panel alignment plane is tilted so that the solar alignment axis is directed toward the sun.

* * * * *